(12) United States Patent
Omura

(10) Patent No.: US 8,804,161 B2
(45) Date of Patent: Aug. 12, 2014

(54) INFORMATION PROCESSING DEVICE, INFORMATION PROCESSING SYSTEM, CONTROL METHOD, AND STORAGE MEDIUM

(71) Applicant: Canon Kabushiki Kaisha, Tokyo (JP)

(72) Inventor: Hiroshi Omura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/795,254

(22) Filed: Mar. 12, 2013

(65) Prior Publication Data

US 2013/0258389 A1 Oct. 3, 2013

(30) Foreign Application Priority Data

Mar. 29, 2012 (JP) ................................. 2012-075948

(51) Int. Cl.
*G06F 15/00* (2006.01)
(52) U.S. Cl.
USPC ....................................... 358/1.14
(58) Field of Classification Search
USPC ....................................... 358/1.14
See application file for complete search history.

(56) References Cited

U.S. PATENT DOCUMENTS

2010/0053670 A1* 3/2010 Jeong et al. .................. 358/1.15
2010/0296122 A1 11/2010 Mitsui

FOREIGN PATENT DOCUMENTS

JP 2010-271772 A 12/2010
JP 2011-070366 A 4/2011

* cited by examiner

*Primary Examiner* — Saeid Ebrahimi Dehkordy
(74) *Attorney, Agent, or Firm* — Carter, DeLuca, Farrell & Schmidt, LLP

(57) ABSTRACT

Provided is an information processing device that processes data including a rendering resource, a first page rendering command including a link to the rendering resource, and a second page rendering command including a link to the rendering resource. The information processing device includes a first transmitting unit configured to transmit the rendering resource and the first page rendering command to an image forming device; a registering unit configured to register a copy of the rendering resource in a storage area other than the image forming device when the first transmitting unit transmits the rendering resource and the first page rendering command to the image forming device; and a second transmitting unit configured to transmit the second page rendering command to the image forming device by setting a link to the copy of the registered rendering resource to the second page rendering command.

23 Claims, 20 Drawing Sheets

FIG. 4

| | | |
|---|---|---|
| | [Content_Types].xml/[0].piece | 401 |
| | _rels/.rels/[0].piece | 402 |
| | [Content_Types].xml/[1].piece | 403 |
| | discard.xml/[0].piece | 404 |
| | _rels/.rels/[1].piece | 405 |
| | [Content_Types].xml/[2].piece | 406 |
| | [Content_Types].xml/[3].piece | 407 |
| | _rels/FixedDocumentSequence.fdseq.rels/[0].piece | 408 |
| | [Content_Types].xml/[4].piece | 409 |
| | Metadata/Job_PT.xml | 410 |
| | FixedDocumentSequence.fdseq/[0].piece | 411 |
| | [Content_Types].xml/[5].piece | 412 |
| | [Content_Types].xml/[6].piece | 413 |
| | Documents/1/_rels/FixedDocument.fdoc.rels/[0].piece | 414 |
| | [Content_Types].xml/[7].piece | 415 |
| | Metadata/MXDC_Empty_PT.xml | 416 |
| 460 | Documents/1/FixedDocument.fdoc/[0].piece | 417 |
| | [Content_Types].xml/[8].piece | 418 |
| | [Content_Types].xml/[9].piece | 419 |
| | Documents/1/Pages/_rels/1.fpage.rels/[0].piece | 420 |
| | [Content_Types].xml/[10].piece | 421 |
| | Documents/1/Metadata/Page1_PT.xml | 422 |
| | Documents/1/Pages/_rels/1.fpage.rels/[1].piece | 423 |
| | [Content_Types].xml/[11].piece | 424 |
| | Documents/1/Resources/Fonts/GUID.odttf/[0].piece | 425 |
| | Documents/1/Resources/Fonts/GUID.odttf/[1].last.piece | 426 |
| | Documents/1/Pages/_rels/1.fpage.rels/[2].last.piece | 427 |
| | Documents/1/Pages/1.fpage | 428 |
| 461 | Documents/1/FixedDocument.fdoc/[1].piece | 429 |
| | [Content_Types].xml/[12].piece | 430 |
| | [Content_Types].xml/[13].piece | 431 |
| | Documents/1/Pages/_rels/2.fpage.rels/[0].piece | 432 |
| | Documents/1/Pages/_rels/2.fpage.rels/[1].piece | 433 |
| | [Content_Types].xml/[14].piece | 434 |
| | Documents/1/Resources/Images/1.JPG | 435 |
| | Documents/1/Pages/_rels/2.fpage.rels/[2].last.piece | 436 |
| | Documents/1/Pages/2.fpage | 437 |
| | ... | |
| 462 | Documents/1/FixedDocument.fdoc/[n-1].piece | 438 |
| | [Content_Types].xml/[k].piece | 439 |
| | [Content_Types].xml/[K+1].piece | 440 |
| | Documents/1/Pages/_rels/n.fpage.rels/[0].piece | 441 |
| | Documents/1/Pages/_rels/n.fpage.rels/[1].piece | 442 |
| | Documents/1/Pages/_rels/n.fpage.rels/[2].last.piece | 443 |
| | Documents/1/Pages/n.fpage | 444 |
| | discard.xml/[1].last.piece | 445 |
| | Documents/1/_rels/FixedDocument.fdoc.rels/[1].last.piece | 446 |
| | Documents/1/FixedDocument.fdoc/[n].last.piece | 447 |
| | _rels/FixedDocumentSequence.fdseq.rels/[1].last.piece | 448 |
| | FixedDocumentSequence.fdseq/[1].last.piece | 449 |
| | _rels/.rels/[2].last.piece | 450 |
| | [Content_Types].xml/[k+2].last.piece | 451 |

Documents/1/FixedDocument.fdoc/[1].piece

```
<PageContent Source="/Documents/1/Pages/2.fpage"/>
```
429

[Content_Types].xml/[12].piece

```
<Override PartName="/Documents/1/Pages/2.fpage"
ContentType="application/vnd.···+xml"/>
```
430

[Content_Types].xml/[13].piece

```
<Override PartName="/Documents/1/Pages/_rels/2.fpage.rels"
ContentType="application/vnd.···+xml"/>
```
431

Documents/1/Pages/_rels/2.fpage.rels/[0].piece

```
<?xml version="1.0" encoding="utf-8"?>
<Relationships xmlns="http://schemas.···">
<Relationship Target="/Documents/1/Metadata/Page1_PT.xml" Id="R0"
Type="http://schemas.···/printticket"/>
```
432

Documents/1/Pages/_rels/2.fpage.rels/[1].piece

```
<Relationship Target="/Documents/1/Resources/Images/1.JPG" Id="R1"
Type="http://schemas.···"/>
```
433

[Content_Types].xml/[14].piece

```
<Override PartName="/Documents/1/Resources/Images/1.JPG" ContentType="image/jpeg"/>
```
434

Documents/1/Resources/Images/1.JPG

```
{Binary data}
```
435

Documents/1/Pages/_rels/2.fpage.rels/[2].last.piece

```
</Relationships>
```
436

Documents/1/Pages/2.fpage

```
<FixedPage Width="1122.56" Height="793.76" xmlns="http://schemas.···" xml:lang="und">
 <Canvas RenderTransform="1,0,0,1,19.52,19.2">
  ....
  <Path Data="M 269.28,307.04 L 814.4,307.04 814.4,448 269.28,448 z" >
   <Path.Fill>
    <ImageBrush ImageSource="/Documents/1/Resources/Images/1.JPG"   /501
     Viewbox="0,0,545,141" TileMode="None" ViewboxUnits="Absolute"
     ViewportUnits="Absolute" Viewport="269.28,307.04,545.12,140.96" />
   </Path.Fill>
  </Path>
```
437

FIG. 6

Documents/1/FixedDocument.fdoc/[n-1].piece

<PageContent Source="/Documents/1/Pages/N.fpage"/>  438

[Content_Types].xml/[k].piece

<Override PartName="/Documents/1/Pages/N.fpage"
ContentType="application/vnd···+xml"/>  439

[Content_Types].xml/[K+1].piece

<Override PartName="/Documents/1/Pages/_rels/N.fpage.rels"
ContentType="application/vnd··· relationships+xml"/>  440

Documents/1/Pages/_rels/n.fpage.rels/[0].piece

<?xml version="1.0" encoding="utf-8"?>
<Relationships xmlns="http://schemas.···">
<Relationship Target="/Documents/1/Metadata/Page1_PT.xml" Id="R0"
Type="http://schemas. ··· "/>  441

Documents/1/Pages/_rels/n.fpage.rels/[1].piece

<Relationship Target="/Documents/1/Resources/Images/1.JPG" Id="R1"
Type="http://schemas.···"/>  442

Documents/1/Pages/_rels/n.fpage.rels/[2].last.piece

</Relationships>  443

Documents/1/Pages/n.fpage

<FixedPage Width="1122.56" Height="793.76" xmlns="http://schemas.···" xml:lang="und">
 <Canvas RenderTransform="1,0,0,1,19.52,19.2">
  ...
  <Path Data="M 269.28,307.04 L 814.4,307.04 814.4,448 269.28,448 z" >
   <Path.Fill>
    <ImageBrush ImageSource="/Documents/1/Resources/Images/1.JPG"  ⟵ 502
     Viewbox="0,0,545,141" TileMode="None" ViewboxUnits="Absolute"
     ViewportUnits="Absolute" Viewport="269.28,307.04,545.12,140.96" />
   </Path.Fill>
  </Path>
  ...
 </Canvas>
</FixedPage>

Documents/1/Pages/n.fpage

```
<FixedPage Width="1122.56" Height="793.76" xmlns="http://schemas.···" xml:lang="und">
 <Canvas RenderTransform="1,0,0,1,19.52,19.2">
  ...
  <Path Data="M 269.28,307.04 L 814.4,307.04 814.4,448 269.28,448 z" >
   <Path.Fill>
    <ImageBrush ImageSource="/Documents/1/Resources/Images/1.JPG"   ─502
     Viewbox="0,0,545,141" TileMode="None" ViewboxUnits="Absolute"
     ViewportUnits="Absolute" Viewport="269.28,307.04,545.12,140.96"  ─504
     xmlns:nsxrd="http://example.com/ns/2011/11/xpsresdownloader"
     nsxrd:ResURI="https://172.16.12.55/ABCFA3DD-9AF5-48b2-8BE6-
     B237AA5B73AA/Documents/1/Images/1.JPG"/>
   </Path.Fill>             ─505
  </Path>
  ...
 </Canvas>
</FixedPage>
```
503

FIG. 7B

Documents/1/Pages/_rels/n.fpage.rels/[1].piece

```
<Relationship Target="/Documents/1/Resources/Images/1.JPG" Id="R1"
 Type="http://schemas.···"
  xmlns:nsxrd="http://example.com/ns/2011/11/xpsresdownloader"   ─507
  nsxrd:ResURI="https://172.16.12.55/ABCFA3DD-9AF5-48b2-8BE6-
  B237AA5B73AA/Documents/1/Images/1.JPG"/>
```
506

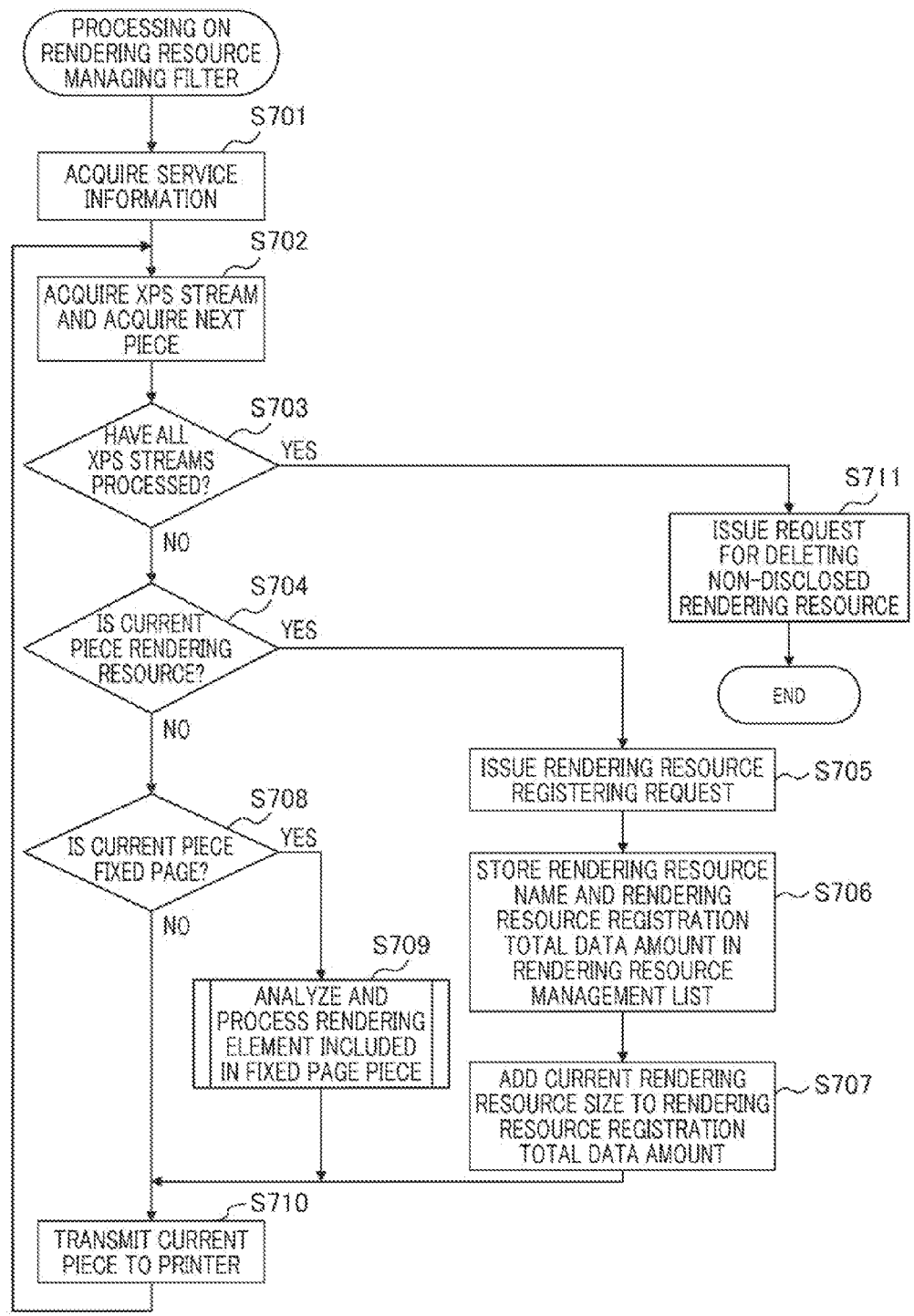

FIG. 10A

```
Service information
Rendering resource storage upper limit for printer:  ~801
10240KB
Rendering resource registering server:
 http://172.16.12.55/  ~802
Rendering resource disclosing server:
 http://172.16.12.55/  ~803
```

| Print job identification information |
|---|
| ABCFA3DD-9AF5-48b2-8BE6-B237AA5B73AA |

810

| Rendering resource registration total data amount [Byte] |
|---|
| 5720306 |

820

| Rendering resource name | Total amount of data upon registration [Byte] |
|---|---|
| Documents/1/Images/1.JPG | 780,831 |
| Documents/1/Images/2.JPG | 1,342,107 |
| Documents/1/Images/3.JPG | 1,962,995 |
| … | |

Rendering resource registering request
Request receiver:
  http://172.16.12.55/ ~841
Rendering resource registering server:
  http://172.16.12.55/ ~842
Rendering resource identification information: ~843
ABCFA3DD—9AF5—48b2—8BE6—B237AA5B73AA/Documents/1/Images/1.JPG
Rendering resource: ~844
  <Binary data>

Rendering resource disclosing request
Request receiver:
  http://172.16.12.55/ ~851
Rendering resource disclosing server:
  http://172.16.12.55/ ~852
Rendering resource identification information: ~853
ABCFA3DD—9AF5—48b2—8BE6—B237AA5B73AA/Documents/1/Images/1.JPG

850

INFORMATION PROCESSING DEVICE, INFORMATION PROCESSING SYSTEM, CONTROL METHOD, AND STORAGE MEDIUM

BACKGROUND OF THE INVENTION

1. Field of the Invention

The present invention relates to an information processing device, an information processing system, a control method, and a storage medium.

2. Description of the Related Art

An XPS (XML Paper Specification) file has been supported as document representation format by Windows Vista (registered trademark) operation system (OS) provided by Microsoft Corporation. The XPS file is a format that can represent a document having a plurality of pages. Each page constituting a document is represented by multiple file data called "part". A main configuration file representing one page includes Fixed page data for referencing intra-page content and a rendering resource such as image data or font referenced from a Fixed page. Fixed page data functions as page rendering information for representing intra-page rendering. In order to provide one XPS file which is easy to handle, these file groups are finally provided as a form archived in ZIP format.

By the support of an XPS file, an XPS print path that is a new print processing system which uses an XPS file as a print spool file has been introduced in the OS by Microsoft Corporation. A printer vendor can provide an XPS filter which converts an XPS file into PDL (Page Description Language) with respect to an XPS print path. By incorporating the XPS filter into the XPS print path, the conventional image forming device (e.g., PDL printer) can execute print processing (for XPS print path, for example, see Japanese Patent Laid-Open No. 2010-271772).

In addition to the conventional PDL printers, there are emerging XPS direct printers which can receive and print an XPS file as such due to the prevalence of the OS. For example, Japanese Patent Laid-Open No. 2011-070366 discloses a method for controlling XPS direct printing that transmits the stream of an XPS file received by an XPS filter to a printer for printout. In order to realize XPS direct printing, a mechanism for receiving an XPS file to be printed in an XPS stream format which is sequentially accessible by an XPS filter is present on the XPS print path. The XPS stream is a structured stream including a Fixed page and a rendering resource referenced from a plurality of different Fixed pages. Thus, a print system in which an information processing device such as a PC distributes an XPS stream to an image forming device for print processing is contemplated.

An XPS file included in an XPS stream has a specification in which one rendering resource can be referenced from a plurality of Fixed pages. This eliminates the need for storing a plurality of the identical rendering resources for each page. For example, the amount of rendering data for an identical image such as a background of a presentation document, a corporate logo, or the like can be efficiently reduced, resulting in suppression of the total data size of an XPS file. In the XPS print path, an XPS stream in XPS format is passed to an XPS filter. However, in the XPS file specification, for example, a rendering resource which is referenced in the first page may be referenced again in a succeeding page such as a page after several tens of pages or after several hundreds of pages. Thus, an image forming device needs to hold all the rendering resources appeared in the XPS stream received from an information processing device until the last page is processed. An image forming device on which a small amount of memory is mounted cannot hold all the rendering resources for an XPS file. Thus, if the rendering resources are deleted exceeding the rendering resource storage upper limit of the image forming device, a rendering command cannot be executed since no rendering resource is present in the image forming device when an identical image is referenced in the succeeding page.

SUMMARY OF THE INVENTION

The information processing device of the present invention processes data including a rendering resource, a first page rendering command including a link to the rendering resource, and a second page rendering command including a link to the rendering resource and provides a rendering resource to an image forming device when the rendering resource is not held in the image forming device.

According to an aspect of the present invention, an information processing device is provided that processes data including a rendering resource, a first page rendering command including a link to the rendering resource, and a second page rendering command including a link to the rendering resource. The information processing device includes a first transmitting unit configured to transmit the rendering resource and the first page rendering command to an image forming device; a registering unit configured to register a copy of the rendering resource in a storage area other than the image forming device when the first transmitting unit transmits the rendering resource and the first page rendering command to the image forming device; and a second transmitting unit configured to transmit the second page rendering command to the image forming device by setting a link to the copy of the registered rendering resource to the second page rendering command.

The information processing device of the present invention can be adapted to provide a rendering resource to an image forming device when the total amount of data of the rendering resource exceeds the rendering resource storage upper limit of the image forming device so that the image forming device cannot hold the rendering resource.

Further features of the present invention will become apparent from the following description of exemplary embodiments with reference to the attached renderings.

BRIEF DESCRIPTION OF THE DRAWINGS

FIG. 4 is a schematic diagram illustrating the data structure of an XPS stream.

FIG. 5 is a diagram illustrating an exemplary content of a local file group for representing second page rendering.

FIG. 6 is a diagram illustrating an exemplary content of a local file group for representing an Nth page rendering.

FIGS. 7A and 7B are diagrams illustrating an exemplary processing of a piece representing a Fixed page and a rendering resource.

FIG. 9 is a flowchart illustrating processing by a rendering resource managing filter.

FIGS. 10A to 10D show a data structure relating to processing by a rendering resource managing filter.

DESCRIPTION OF THE EMBODIMENTS

First Embodiment

Figure 1:
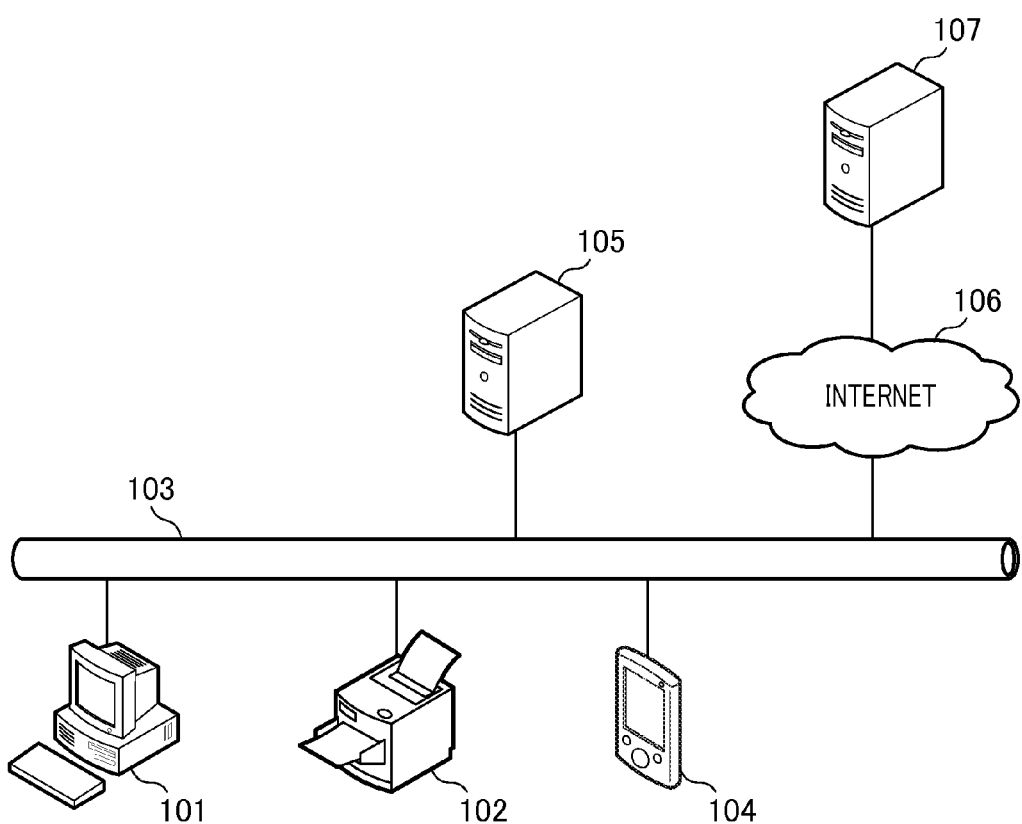
FIG. 1 shows an exemplary configuration of an information processing system.

FIG. 1 shows an exemplary configuration of an information processing system of the present embodiment. The information processing system shown in FIG. 1 is a print system. The print system includes a client computer 101 that functions as an information processing device and an image forming device 102 that can receive and print out print data in XPS stream format. The client computer 101 transmits an XPS stream to the image forming device 102 and then causes the image forming device 102 to execute print processing. The XPS stream is a structured stream including a Fixed page which is page rendering information for representing intra-page rendering and a rendering resource referenced from a plurality of different Fixed pages. The client computer 101 can be communicably connected to the image forming device 102 via LAN (Local Area Network) 103. Other configuration devices such as servers 105 and 107, a mobile terminal 104, and the like shown in FIG. 1 will be referenced upon description of a second embodiment.

Figure 2:
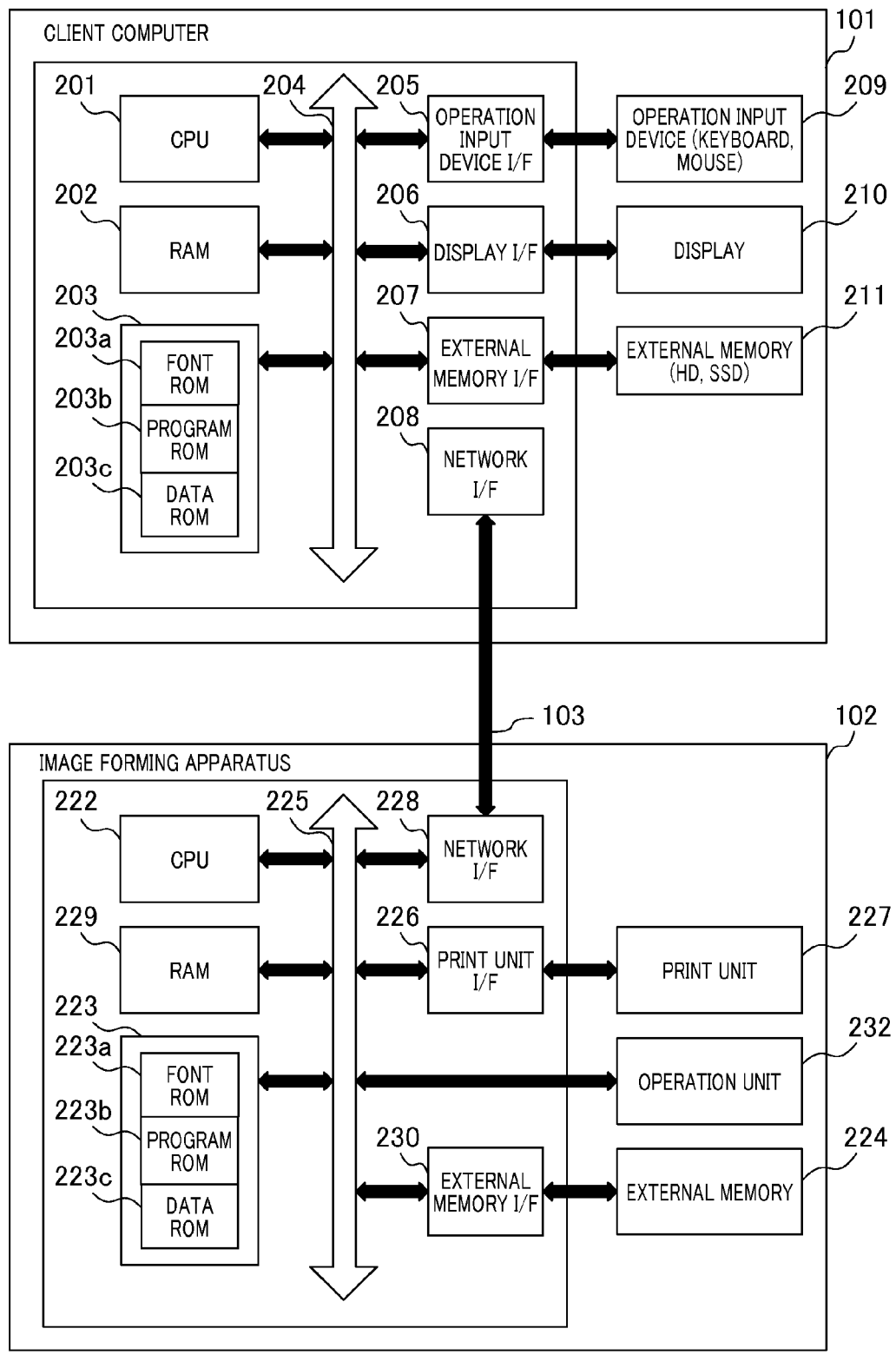
FIG. 2 shows the hardware configuration of a client computer and a printer.

FIG. 2 is a block diagram illustrating the hardware configuration of the client computer 101 and the image forming device 102 shown in FIG. 1. In the client computer 101, a CPU (Central Processing Unit) 201 is a unit that executes various programs to thereby realize various functions. A RAM (Random Access Memory) 202 functions as a main memory, a work area, and the like of the CPU 201. A ROM (Read Only Memory) 203 stores various programs and data. The ROM 203 is configured by being divided into a font ROM 203a for storing various fonts, a program ROM 203b for storing a boot program, BIOS, and the like, and a data ROM 203c for storing various data.

An operation input device I/F 205 controls an operation input device 209 such as a keyboard, a pointing device (mouse), or the like. A display I/F 206 controls display on a display 210. An external memory I/F 207 controls access to/from an external memory 211 such as a hard disk (HD), a Solid State Disk (step SSD), or the like. The external memory 211 functions as a computer-readable storage medium that stores an operating system program (hereinafter referred to as "OS"), various applications, various files, and the like. Furthermore, the external memory 211 stores an executable program relating to print processing concerning the present invention. A network I/F 208 is connected to an output device 102 via a network 103 to thereby perform communication control processing to/from the output device 102.

Next, a description will be given of the hardware configuration of the image forming device 102. A CPU 222 controls the entire operation of the image forming device 102. A RAM 229 functions as a main memory, a work area, or the like of the CPU 222 and is also used as an output information spread area and an environment data storage area. The RAM 229 also includes an NVRAM (Non-volatile RAM) area. The memory capacity of the RAM 229 is expandable by an option RAM which is connected to an additional port (not shown).

A ROM 223 includes a font ROM 223a for storing various fonts, a program ROM 223b for storing control programs or the like to be executed by the CPU 222, and a data ROM 223c for storing various data. A network I/F 228 receives/transmits data from/to the client computer 101. A print unit I/F 226 controls an interface with a print unit 227 serving as a printer engine. Access to an external memory 224 is controlled by an external memory I/F 230. Examples of the external memory 224 include a hard disk (HD), a Solid State Disk (step SSD), and the like to be connected as an option. The external memory 224 stores font data, an emulation program, form data, and the like. When an external memory such as a hard disk is not connected to the external memory I/F 230, information or the like for use in the client computer 101 is stored in the data ROM 223c of the ROM 223.

An operation unit 232 is provided with an operation panel that accepts an operation by a user, and the CPU 222 outputs an image signal serving as output information to the print unit 227 via the print unit I/F 226 based on a control program or the like stored in the program ROM 223b of the ROM 223. Also, the CPU 222 can perform communication processing with the client computer 101 via the network I/F 228. The CPU 222 can receive print data transmitted from the client computer 101 and can notify the client computer 101 of setting information in the output device 102.

Figure 3:
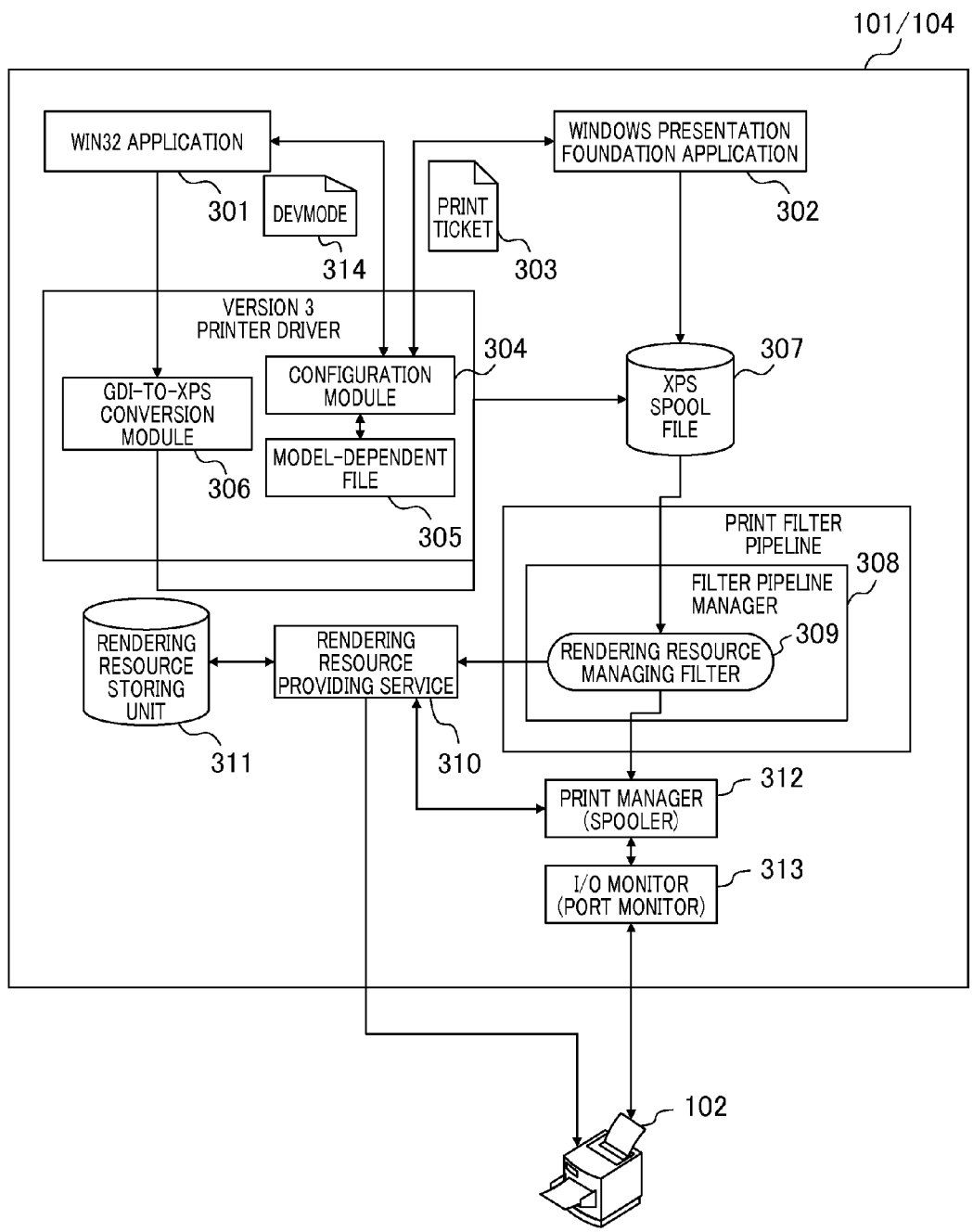
FIG. 3 is a block diagram illustrating the module configuration of an XPS print path.

FIG. 3 is a block diagram illustrating the module configuration of an XPS print path. Each module constituting the XPS print path is stored in the external memory 211. Each module is loaded into the RAM 202 as appropriate and is executed by the CPU 201 on the client computer 101. The XPS print path is a print system in which the CPU 201 uses an XPS file format as spool data so as to execute print processing. As an application capable of executing print processing in the print system, there are two types of application programs depending on its architecture. The first program is a Win32 application program 301 (Win32 application). The second program is a Windows Presentation Foundation application program 302 (WPF application). The applications 301 and 302 displayed on the display 210 receive a print execution command when receiving an operation by a user through the operation input device 209 such as a mouse. Upon reception of the print execution command, the applications 301 and 302 execute print processing. The applications 301 and 302 realize print processing by sequentially executing three processing operations, i.e., printer selection, print setting creation, and rendering processing.

Firstly, the applications 301 and 302 select a printer that executes printing. This means the same as selection of a printer driver corresponding to the image forming device 102 that executes printing. Next, the applications 301 and 302 create print settings using a configuration module 304 of a printer driver. The configuration module 304 creates print settings using a model-dependent file 305 of a printer for printout. In the Win32 application 301, a binary DEVMODE structure 314 is created as print setting data. In the WPF application 302, a Print Ticket 303 described in a mark-up language (XML) is created.

After the print settings are settled, the applications 301 and 302 perform rendering processing relating to printing. When printing is performed from the Win32 application 301, rendering data is sent to a GDI-to-XPS conversion module 306 in the form of a printer driver version 3. Consequently, an XPS spool file 307 is created. The printer driver version 3 refers to a printer driver compatible with Microsoft (registered trademark) Windows 2000 (registered trademark) or later. At this time, the GDI-to-XPS conversion module 306 calls the configuration module 304 to thereby convert print settings from the DEVMODE structure 314 format into the Print Ticket 303 format. When printing is performed from the WPF application 302, there are two cases in which the WPF application itself generates an XPS file 307 or an OS generates an XPS file in response to the command from the WPF application. As described above, in the XPS print path, the XPS spool file 307 is always generated upon printing. This is the feature of the XPS print path.

Next, the generated XPS spool file 307 is processed by a print filter pipeline. A plurality of filters created by a hardware vendor is generally arranged on the print filter pipeline. A filter pipeline manager 308 firstly arranges a plurality of filters in order on the basis of configuration information about the filter provided from a hardware vendor. Furthermore, the output of the first filter and the input of the next filter are connected between adjacent filters in a pipeline configuration. The filter pipeline manager 308 passes the XPS spool file 307 to the leading filter and then passes information processed by the filter to the next filter. By transferring information between filters, print data that can be interpreted by the image forming device 102 can be finally generated. The processing is referred to as "XPS filter pipeline processing".

The XPS file is a file in which a plurality of files each of which is called "part" serving as a reference unit having a meaning is archived in one file in ZIP format. When there are many constitution pages included in an XPS file, the size of data relatively increases. Here, assume the case where information is passed to the next filter as a unit of file in an XPS file during XPS filter pipeline processing. In this case, processing on the next filter cannot be started until a filter processes all the parts constituting a file. Since processing on the next filter cannot be started until processing on one filter is completed, the start of printing performed by the image forming device 102 is delayed. In order to increase the efficiency of processing, it is preferable that XPS spool file information is delivered per unit of data size as small as possible. Thus, in the XPS print path, a piece of a minimum unit is delivered by a filter as a unit of data delivery, where one part is divided into a plurality of pieces. The format of data in which one part is divided into a plurality of parts is called "interleave". FIG. 4 shows an exemplary XPS stream 400 in interleave format, where the XPS stream 400 is passed to a rendering resource managing filter 309.

Furthermore, since the plurality of filters 309 is arranged during XPS filter pipeline processing, processing can be efficiently performed by running the plurality of filters 309 concurrently. For the purpose of efficiency, when the filter 309 receives the XPS spool file 307 in XPS stream format, access is limited only in the sequential direction from a piece 401 to a piece 451. Since random access is not permitted, there is no need to perform access exclusive processing for the XPS spool file 307 between filters that receive data in XPS stream format. In this manner, the operation can be concurrently performed between a plurality of filters.

The XPS stream processed by the filter 309 is managed by a print manager 312 that performs schedule management for print processing and a print job is registered in a queue one after another. When the image forming device 102 is in a printable state, XPS data is transmitted to the image forming device 102 via an I/O monitor 313 in order registered in a queue. In this manner, an XPS stream for printing is transmitted from the applications 301 and 302 to the image forming device 102.

In the present embodiment, the client computer 101 includes the rendering resource managing filter 309 as a filter in the XPS filter pipeline. The image forming device 102 according to the first embodiment can interpret and print the XPS stream. Thus, the rendering resource managing filter 309 inputs and outputs data in XPS stream format. Furthermore, the client computer 101 includes a rendering resource providing service 310 and a rendering resource storing unit 311 that operate together with the rendering resource managing filter 309. The functions provided by the rendering resource providing service 310 and the rendering resource storing unit 311 will be described below.

FIG. 4 shows an exemplary data structure of an XPS stream which is data to be printed constituted by a plurality of pages. Hereinafter, a description will be given of the summary of an XPS stream by use of this example. The XPS stream is passed from the XPS spool file 307 to the rendering resource managing filter 309 as a data stream archived in ZIP format. FIG. 4 is a schematic diagram focusing on ZIP format local files in an XPS stream. The ZIP local files constituting an XPS stream are shown by solid line squares 401 to 451. In this example, 51 local files are shown in FIG. 4. In the example shown in FIG. 4, both local files serving as parts and local files serving as pieces are mixed. The local files passed in the state of part are local files 410, 416, 422, 428, 435, 437, and 444. Other parts are passed by being divided into a plurality of pieces. Those divided into pieces are a plurality of local files having a file extension of ".piece". These local files are connected by associating with a logical folder having a name "part". The interleaved parts are piece files in a numerically ordered sequence in the format of [i].piece, where the interleaved parts are represented by [0].piece, [1].piece, and so on starting from file leading data. Among the divided pieces, the last piece has a special name of [i].last.piece.

For example, the ".rels" part is divided into three pieces 402, 405, and 450. The three pieces are connected by associating with a logical folder having a part name of "_rels/.rels". In FIG. 4, a portion representing rendering in a logical page is represented by broken lines 460, 461, and 462. The broken lines 460, 461, and 462 represent rendering in the first page, the second page, and the Nth page, respectively. In FIG. 4, local files representing rendering from the third page to the (N−1)th page, which are present between the broken line 461 and the broken line 462, are omitted due to limitation of description space. The content of a local file group representing second page rendering shown by the broken line 461 is shown in FIG. 5. The content of a local file group representing Nth page rendering shown by the broken line 462 is shown in FIG. 6. Actual intra-page rendering is represented by a part called "Fixed page". Reference numeral 437 in FIG. 5 and reference numeral 444 in FIG. 6 correspond to the parts called "Fixed page". Note that the fact that these parts are the parts of Fixed page is described in [Content_types].xml pieces represented by reference numerals 430 and 439, respectively, and can be determined by analyzing a description content.

The Fixed page is a file in XML format and is a reference page that can reference and designate the detail of rendering by describing the type of rendering using an XML element. As shown by reference numeral 437 in FIG. 5 and reference numeral 444 in FIG. 6, <Path> is a representation for designating a path constituting a rendering figure and designates the apex of a path using Data attributes. The child element <Path.Fill> is a designation for filling <Path> defined as a parent element. The child element <ImageBrush> designates an image brush for use in filling. A bitmap used for an image brush is designated by the file path of a local file such as 501 or 502. The external part required for performing rendering, such as image, font, or the like designated/referenced from a Fixed page is referred to as a "rendering resource". In the present embodiment, the file path of a local file for referencing a rendering resource is also referred to as "rendering resource identification information".

In this example, a bitmap used for an image brush is a common JPEG file "1.JPEG" and a part to be referenced is a local file 435 constituted by binary data. Note that the fact that the local file 435 is a file in JPEG format is described in the [Content_types].xml piece represented by reference numeral 434. As described above, the XPS file has a specification in which one rendering resource can be referenced from different Fixed pages. This eliminates the need for storing a plurality of the identical rendering resources for each page. Thus, an identical image such as a background for a presentation document, a corporate logo, or the like can be efficiently rendered, resulting in suppression of the total data in an XPS stream. In the XPS print path, an XPS stream in XPS format is passed to an XPS filter. When this specification is employed, a rendering resource which is referenced in the second page may be referenced again in a succeeding page such as the Nth page as shown in the example in FIG. 4. Thus, the image forming device 102 needs to hold all the rendering resources appeared in the XPS stream, i.e., all the rendering resources referenced in the second page until the last page is processed. An image forming device on which a small amount of memory is mounted may not hold all the rendering resources for an XPS file. Such circumstances may be overcome by information processing devices of the embodiments to be described below.

In the first embodiment, assume that processing is executed in an environment constituted by the client computer 101, the image forming device 102, and the LAN 103 connected thereto. The rendering resource managing filter 309, the rendering resource providing service 310, and the rendering resource storing unit 311 provided in the client computer 101 are operated by the CPU 201. In this example, hardware/software modules including the rendering resource managing filter 309, the rendering resource providing service 310, and the rendering resource storing unit 311 provided in the client computer 101 are collectively referred to as a "print auxiliary device".

Figure 8:
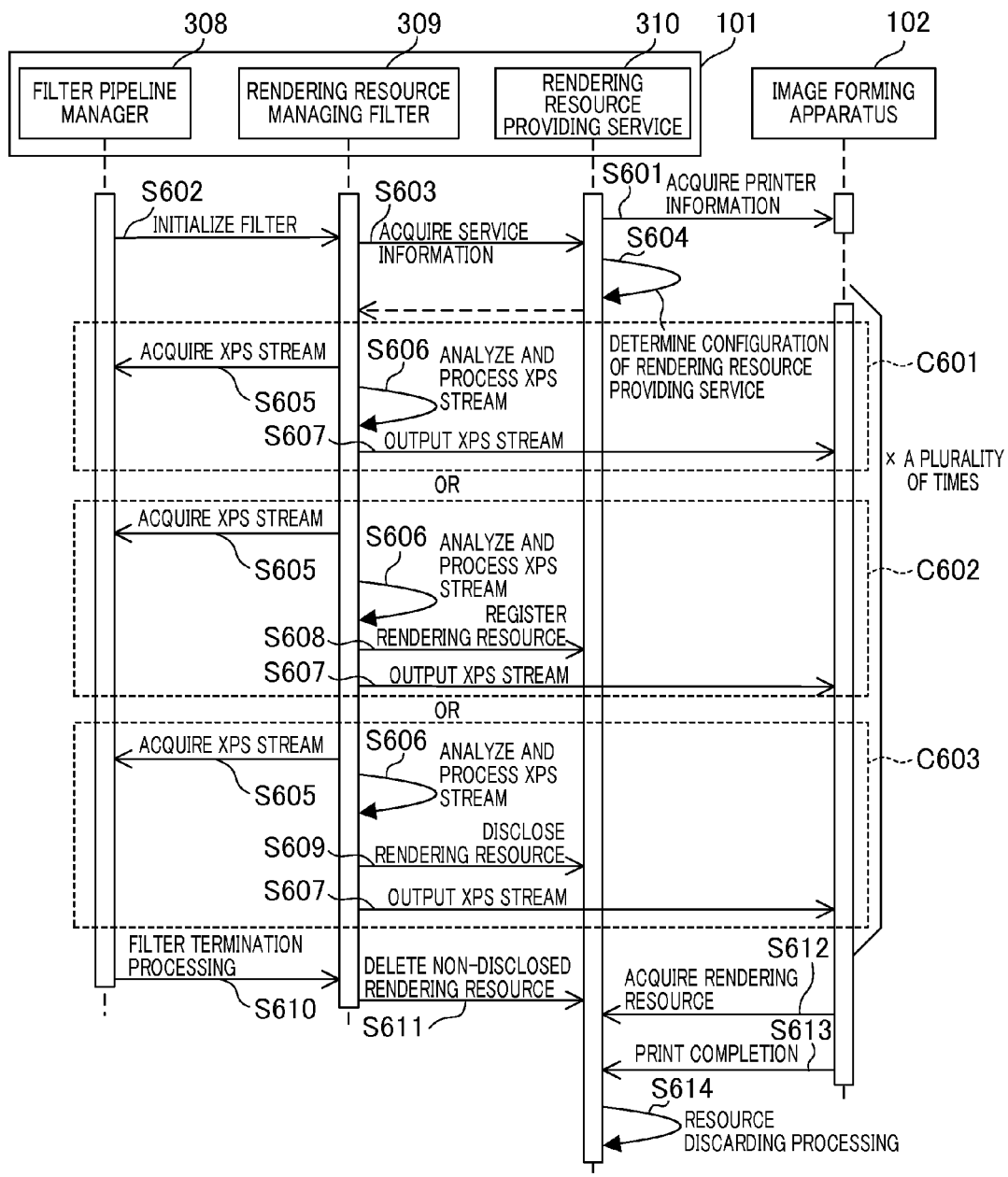
FIG. 8 is a sequence diagram illustrating processing relating to rendering resource according to a first embodiment.
Figure 14A:
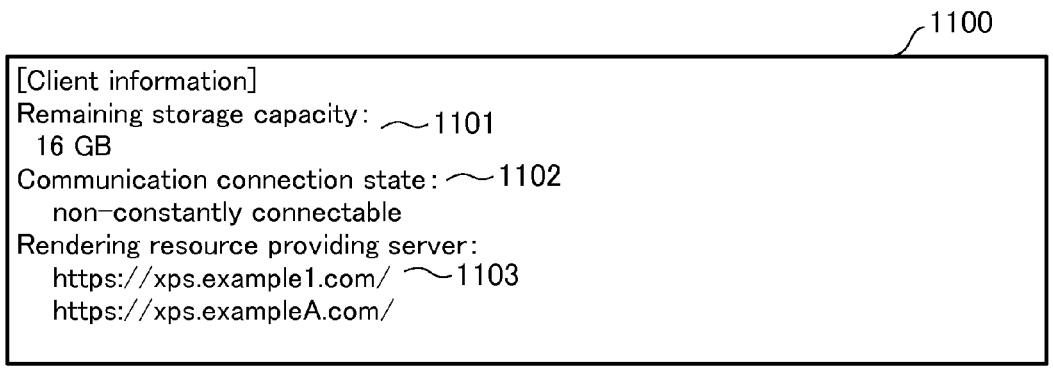
FIGS. 14A to 14C show a data structure relating to processing by a rendering resource providing service.
Figure 14B:
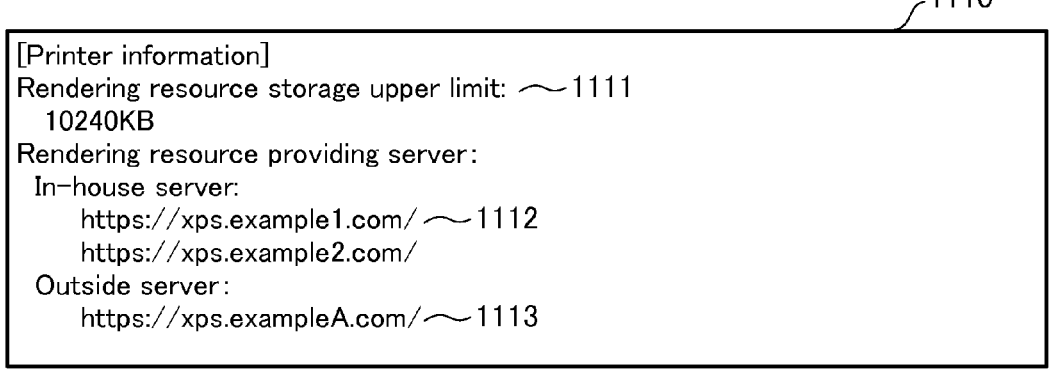

FIG. 8 is a sequence diagram illustrating information exchange between each of the filter pipeline manager 308, the rendering resource managing filter 309, and the rendering resource providing service 310 and the image forming device 102. Firstly, the rendering resource providing service 310 acquires printer information 1110 shown in FIG. 14B from the image forming device 102 as initial preparation (step S601). The printer information 1110 includes a rendering resource storage upper limit 1111 that is a storage upper limit value for a storage capacity for holding rendering resources by the image forming device 102. Furthermore, the printer information 1110 also includes information about a rendering resource providing server which is communicable by the image forming device 102, where the server is set in the image forming device 102. Reference numeral 1112 denotes a list of in-house servers and reference numeral 1113 denotes a list of outside servers.

In the first embodiment, a description will be given of the operation without using the server lists 1112 and 1113. The operation in step S601 is typically performed when the client computer 101 and the image forming device 102 are ready for printing or when there is any change in settings or memory configuration relating to the image forming device 102. The operation in step S601 may be periodically performed by setting a time interval or may also be performed at a specific timing upon print execution. Note that the rendering resource providing service 310 may not acquire the printer information 1110 from the image forming device 102 depending on the connection format between the client computer 101 and the image forming device 102 or a communication status therebetween. In this case, the rendering resource providing service 310 determines the model name of the image forming device 102 from a printer driver used for printing and then determines that the total amount of data of rendering resources that can always be stored in the model is a rendering resource storage upper limit value.

With reference to FIG. 8, a description will be continuously given of the operation performed when a print request is received from a user. Firstly, the filter pipeline manager 308 initializes the rendering resource managing filter 309 (step S602). During the initialization, the rendering resource managing filter 309 generates print job identification information 810 shown in FIG. 10B, where the print job identification information 810 can uniquely identify a print job. In the present embodiment, a UUID (Universally Unique Identifier) is generated as the print job identification information 810. Next, the rendering resource managing filter 309 makes a service information acquiring request to the rendering resource providing service 310. In the service information acquiring request, the client computer 101 is described as a request receiver. The rendering resource service 310 determines the configuration of a rendering resource providing service in order to provide service information (step S602). The determination processing will be described in detail in a second embodiment with reference to FIG. 16.

In the first embodiment, the rendering resource service 310 passes service information 800 shown in FIG. 10A to the rendering resource managing filter 309. The service information 800 includes a rendering resource storage upper limit 801 for a printer described in step S601. Furthermore, the service information 800 includes a rendering resource registering server 802 that indicates a server for temporarily storing a rendering resource in order to determine a disclosing target and a rendering resource disclosing server 803 that indicates a server for actually disclosing a rendering resource. In the first embodiment, the client computer 101 is designated as the rendering resource registering server 802 and the rendering resource disclosing server 803. Service information refers to a service content that is provided by a print auxiliary device determined by the processing. In other words, according to service information shown in FIG. 10A, the rendering resource service 310 determines in step S602 that the rendering resource storage upper limit 801 for a printer is 10240 KB and a client computer performs rendering resource registration and disclosure. After reception of service information, the rendering resource managing filter 309 acquires an XPS stream from the filter pipeline manager 308 (step S605).

For ease of description, the rendering resource managing filter 309 is intended to acquire an XPS stream part by part or piece by piece from the filter pipeline manager 308 as shown in FIG. 4. In the actual XPS printer path, a plurality of parts and pieces or a fragmented part or piece is acquired as an XPS stream. In this case, the rendering resource managing filter 309 makes parts or pieces using the XPS stream and can acquire a fragmented part or piece. The rendering resource managing filter 309 analyzes the acquired XPS stream and processes it as appropriate (step S605). The content of processing will be described below. There are three types of cases C601 to C603 depending on the result of analysis. The rendering resource managing filter 309 acquires an XPS stream up to the last XPS stream (step S605) and repeats processing depending on the cases C601 to C603.

The first case is the case where there is no need to register and discloses a rendering resource. More specifically, the rendering resource managing filter 309 analyzes the XPS stream acquired in step S605 (step S606). The first case is the case where there is no rendering resource and no Fixed page, the XPS stream has a Fixed page but does not include any rendering resource, or there is no need to disclose a rendering resource as a result of analysis. As a result of analysis, when the case is the first case, the rendering resource managing filter 309 outputs the acquired XPS stream without processing to the image forming device 102 (step S607).

The second case is the case where the XPS stream acquired by the rendering resource managing filter 309 in step S605 is a rendering resource. In this case, the rendering resource managing filter 309 makes a request for registering the acquired rendering resource to the rendering resource service 310 (step S608). In other words, the rendering resource managing filter 309 make a request for registering a copy of the rendering resource to the rendering resource service 310 which is a storage area other than the image forming device 102. An exemplary rendering resource registering request is shown in FIG. 10C. A description will be given of the structure of a rendering resource registering request on the basis of the second case. A rendering resource registering request 840 shown in FIG. 10C is constituted of a rendering resource registering request receiver 841, a rendering resource registering server 842, identification information 843 about a rendering resource to be registered, and binary data 844 for the rendering resource. The rendering resource registering server 802 in the service information 800 is designated as a rendering resource registering request receiver 841. A rendering resource registering server designated by the service information 800 is designated as the rendering resource registering server 842. In the present embodiment, a link to the client computer 101 is designated together with the rendering resource registering request receiver 841 and the rendering resource registering server 842. The identification information 843 about a rendering resource to be registered is a character string that is generated by connecting the character string of the print job identification information 810 with that of the name of a rendering resource to be registered by means of "/". Binary data for the rendering resource 435 is stored in the rendering resource binary data 844. Next, the rendering resource managing filter 309 outputs the XPS stream, which includes a first page rendering command including a link to a rendering resource, to the image forming device 102 as it is (step S607).

Finally, the third case is the case where the XPS stream acquired by the rendering resource managing filter 309 in step S605 is a Fixed page and the rendering resource managing filter 309 determines that a rendering resource related to the Fixed page needs to be disclosed. In this case, the rendering resource managing filter 309 processes the acquired Fixed page (step S606). As an example of processing of a Fixed page, the Fixed page 444 subjected to processing is shown in FIG. 7A. In the Fixed page 503, new attributes 504 and 505 are added in the element <ImageBrush>. Each of the attributes 504 and 505 indicates a link to a copy of a rendering resource. The attribute 504 is a name space for a rendering resource providing service. The attribute 504 is uniquely defined so as not to overlap with an attribute defined by a third party. The attribute 505 represents the disclosed location of the bitmap 502 used for an image brush. The rendering resource managing filter 309 generates a disclosed location by connecting the character string of the rendering resource disclosing server 803 with that of identification information about a rendering resource to be disclosed by means of "/". Drawing resource identification information matches the identification information 843 about the rendering resource designated by the rendering resource registering request 840. By means of the processing, the image forming device 102 can acquire, from the client computer 101, a rendering resource based on positional information about the rendering resource when the image forming device 102 cannot hold the rendering resource. Next, the rendering resource managing filter 309 makes a disclosing request to the rendering resource service 310 by setting the rendering resource stored in the rendering resource storing unit 311 in advance as a rendering resource to be provided (step S609).

An exemplary rendering resource disclosing request is shown in FIG. 10D. A rendering resource disclosing request 850 is constituted of a rendering resource disclosing request receiver 851, a rendering resource disclosing server 852, and an identification information 853 about a rendering resource to be disclosed. The rendering resource registering server 802 is designated as the request receiver 851 for the registration of a rendering resource. The rendering resource disclosing server 803 designated by the service information 800 is designated as the rendering resource disclosing request receiver 852. In the present embodiment, the client computer 101 is designated together with the rendering resource disclosing request receiver 851 and the rendering resource disclosing server 852. The identification information 853 about a rendering resource to be disclosed is generated by connecting the character string of the print job identification information 810 with that of the name of a rendering resource to be registered by means of "/". Then, the rendering resource managing filter 309 outputs the Fixed page subjected to processing to the image forming device 102 (step S607). In other words, the rendering resource managing filter 309 outputs an XPS stream including a second page rendering command in which a link to a copy of a rendering resource has been set to the image forming device 102. Although the printer manager 312 and the I/O monitor 313 are not shown in FIG. 8 for ease of illustration, the output of an XPS stream to the image forming device 102 (step S607) is made by using the printer manager 312 and the I/O monitor 313 as described with reference to FIG. 3.

When the rendering resource managing filter 309 acquires all of XPS stream, filter termination processing is called from the filter pipeline manager 308 (step S610). The rendering resource managing filter 309 makes a request for deleting a non-disclosed rendering resource to the rendering resource service 310 (step S611). The non-disclosed rendering resource deleting request is constituted of the rendering resource registration destination 802 serving as a request receiver and the print job identification number 810. The purpose of the request is to execute deletion of a rendering resource which has been registered but is not disclosed, such as a rendering resource which is unnecessary to be disclosed. In other words, the rendering resource managing filter 309 functions as a deleting request unit that makes a deleting request for deleting a non-disclosed rendering resource from among the registered rendering resources to the rendering resource registration destination. In this manner, an excess amount of data can be reduced.

Upon reception of XPS stream output (step S607) from the client computer 101, the image forming device 102 performs print processing asynchronously from the client computer 101. During the print processing, the image forming device 102 holds a rendering resource included in an XPS stream in the RAM 229 or the external memory 224. However, when the total amount of data of the rendering resource exceeds the rendering resource storage upper limit (reference numeral 801 in FIG. 10A), the image forming device 102 cannot hold the rendering resource, and thus, the currently held rendering resource needs to be deleted in order from old data. Through deletion processing on the image forming device 102, the rendering resource 435 which is being analyzed for printing, for example, the Fixed page 503, i.e., binary data may have already been deleted from the RAM 229 or the external memory 224. In this case, the image forming device 102 makes a rendering resource acquiring request to the rendering resource managing filter 309 based on the description of the attribute 505 in the Fixed page 503 (step S612). After completion of printing, the image forming device 102 makes a print completion request to the disclosing server (the rendering resource providing service 310) for disclosing the rendering resource described in the attribute 505 in a Fixed page (step S613). The print completion request includes the print job identification number 810. Upon reception of the print completion request, the rendering resource providing service 310 deletes all the disclosed rendering resources associated with the print job identification number 810.

FIG. 9 is a flowchart illustrating processing on the rendering resource managing filter 309. The processing corresponds to steps S603, S605 to S609, and S611 in FIG. 8. The rendering resource managing filter 309 is typically stored in the external memory 211. The rendering resource managing filter 309 is read into the RAM 202 by the request made by using the filter pipeline manager 308 and then is executed by the CPU 201. The rendering resource managing filter 309 acquires service information from the rendering resource providing service 310 due to filter initialization by the filter pipeline manager 308 (step S701). The service information 800 is information shown in FIG. 10A and the pieces of an XPS stream are processed on the basis of information. Next, the rendering resource managing filter 309 acquires an XPS stream as shown in FIG. 4 from the filter pipeline manager 308 to thereby extract pieces successively (step S702). The rendering resource managing filter 309 advances the process to step S704 when any piece of the XPS stream remains. When all the pieces of the XPS stream are processed, the process advances to step S711.

In step S704, the rendering resource managing filter 309 determines whether or not the current piece is a rendering resource such as the one denoted by reference numeral 435. When the current piece is a rendering resource, the rendering resource managing filter 309 advances the process to step S710 after completion of rendering resource registration processing in steps S705 to S707. When the rendering resource managing filter 309 determines that the current piece is not a rendering resource, the process advances to step S708 and the rendering resource managing filter 309 determines whether or not the current piece is a Fixed page such as those denoted by reference numerals 428, 437, and 444. When the current piece is a piece in a Fixed page, the rendering resource managing filter 309 analyzes a rendering element included in a piece in a Fixed page, i.e., the current piece, and processes the current piece as appropriate (step S709). Finally, the rendering resource managing filter 309 transmits the current piece processed as appropriate to the image forming device 102 (step S710). The rendering resource managing filter 309 repeats processing until all the pieces of the XPS stream are subjected to processing. The rendering resource managing filter 309 processes all the pieces of the XPS stream and then issues a request for deleting a rendering resource which has been registered but not been disclosed to the rendering resource providing service 310 (step S711). Then, the process ends.

Next, a description will be given of the processing for a rendering resource in steps S705 to S707. In the present embodiment, the rendering resource managing filter 309 performs processing in steps S705 to S707 prior to the reference of a Fixed page. For the current rendering resource, the rendering resource managing filter 309 issues the rendering resource registering request 840 to the rendering resource service 310 (step S705). In other words, the rendering resource managing filter 309 functions as a registering unit that makes a request for registering a rendering resource included in an XPS stream. As shown in FIG. 10B, the rendering resource managing filter 309 holds a rendering resource registration total data amount 820 that has been registered with a current print job. The rendering resource registration total data amount is the total amount of data for the registered rendering resource upon registration of the rendering resource. The value of the rendering resource registration total data amount on commencement of a print job is zero.

As shown in FIG. 10B, the rendering resource managing filter 309 also holds the names of rendering resources and a list of the total amount of data upon registration as a rendering resource management list 830. The rendering resource managing filter 309 registers the name of the current rendering resource and the current rendering resource registration total data amount 820 in the rendering resource management list 830 (step S706). Then, the data size of the current rendering resource registered in step S705 is added to the rendering resource registration total data amount 820 (step S707). While, in the present embodiment, a rendering resource name and the total amount of data upon registration may be listed by being associated with each other, the file path of a local file as shown by reference numeral 501 in FIG. 5 and reference numeral 502 in FIG. 6 instead of a rendering resource name are listed by being associated with the total amount of data. During rendering resource registration processing in steps S705 to S707, the rendering resource managing filter 309 analyzes the XPS stream and does not register the identical rendering resource which has found out in the second or subsequent registration processing. The reason for this is that, once a rendering resource is registered, the rendering resource can be referenced from a Fixed page based on rendering resource identification information.

Figure 11:
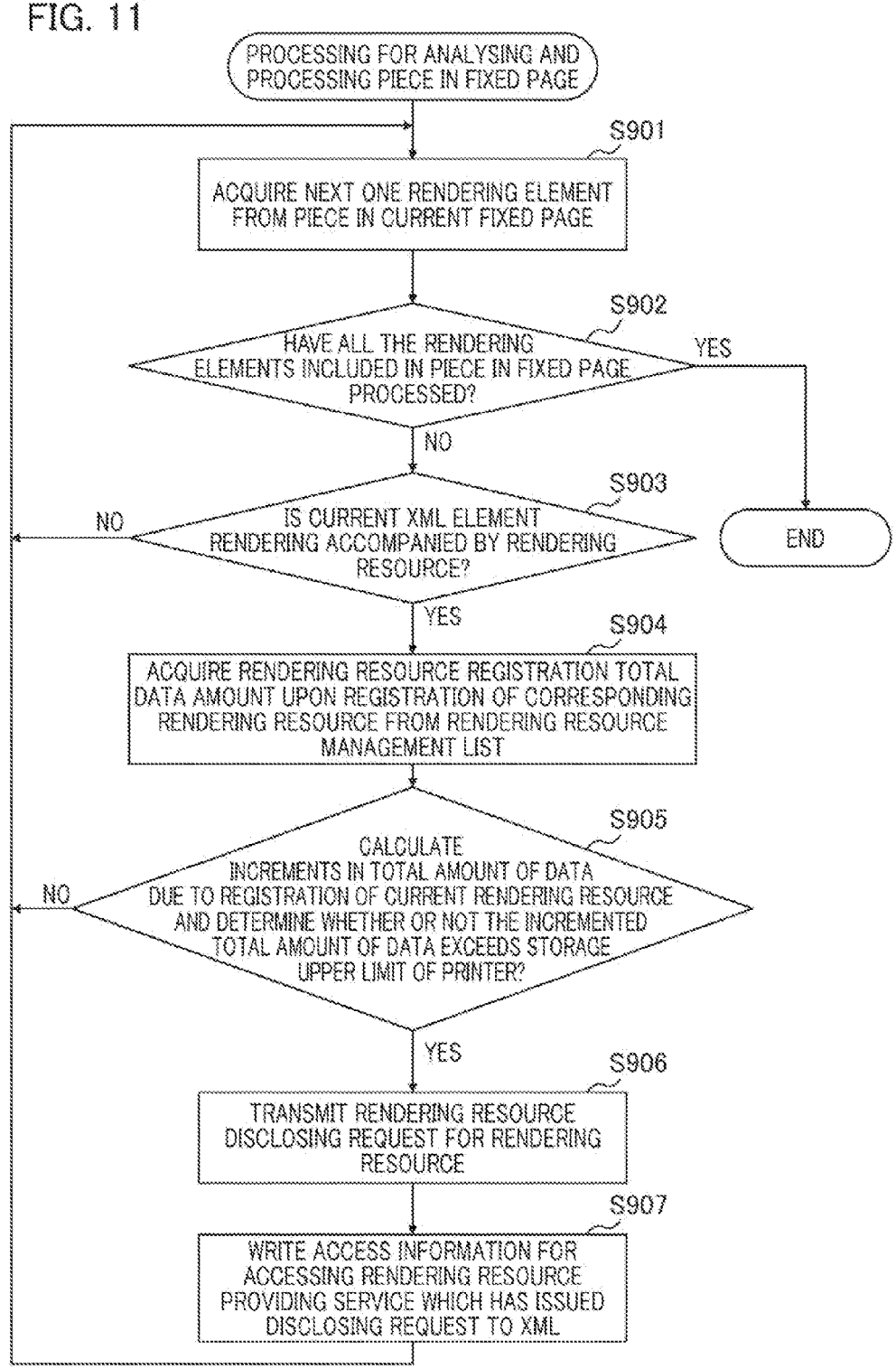
FIG. 11 is a flowchart illustrating analysis processing by a rendering resource managing filter.

FIG. 11 is a flowchart illustrating the analysis and processing of pieces in a Fixed page. The analysis and processing are executed as a subroutine in step S709 of FIG. 9. The rendering resource managing filter 309 sequentially acquires a rendering element from the current piece in a Fixed page one by one (step S901). The rendering resource managing filter 309 repeats processing in steps S903 to S907 until the rendering resource managing filter 309 is processed all the rendering elements (step S902). As the processing for each rendering element, the rendering resource managing filter 309 determines whether or not each rendering element is a rendering element accompanied by a rendering resource, more specifically, determines whether or not the image forming device 102 requests a rendering resource (step S903). For a rendering element accompanied by a rendering resource, the rendering resource managing filter 309 acquires a rendering resource registration total data amount upon registration of the corresponding rendering resource from the rendering resource management list 830 (step S904). Furthermore, the rendering resource managing filter 309 acquires the current rendering resource registration total data amount 820 to thereby calculate the increments in data size from the registration of the rendering resource.

An a result of calculation, it is determined whether or not the incremented amount of data of the rendering resource exceeds the rendering resource storage upper limit of a printer described in the service information acquired in step S701 (step S905). When the incremented amount of data exceeds the rendering resource storage upper limit, there is a high probability that the rendering resource is deleted from the image forming device 102. Thus, for the rendering resource, the rendering resource managing filter 309 issues the rendering resource disclosing request 850 shown in FIG. 10D to the rendering resource providing service 310 (step S906). The rendering resource disclosing request is a request (management request) for managing the requested rendering resource as a rendering resource to be provided. In other words, the rendering resource managing filter 309 functions as a management request unit that analyzes a Fixed page included in an XPS stream and makes the following management request. When the rendering resource registration total data upon registration of a rendering resource referenced by a Fixed page exceeds the rendering resource storage upper limit value, the rendering resource managing filter 309 executes a management request for managing a rendering resource to be referenced.

Furthermore, as shown by reference numeral 505 in FIG. 7A, the rendering resource managing filter 309 writes access information for accessing a rendering resource to which the rendering resource disclosing request has been issued as an attribute of the rendering element (step S907). In other words, the rendering resource managing filter 309 sets access information for accessing a rendering resource to be provided under management to the analyzed Fixed page. In this manner, even when the rendering resource in question has been deleted from the image forming device 102, the image forming device 102 can acquire the rendering resource from a disclosure destination (management destination). The analyzed and processed Fixed page described with reference to FIG. 11 and the rendering data subjected to processing in step S707 in FIG. 9 are transmitted to the image forming device 102. In other words, the rendering resource managing filter 309 functions as a transmission unit that transmits a Fixed page in which access information is set and the registered rendering resource to the image forming device 102.

Figure 12:
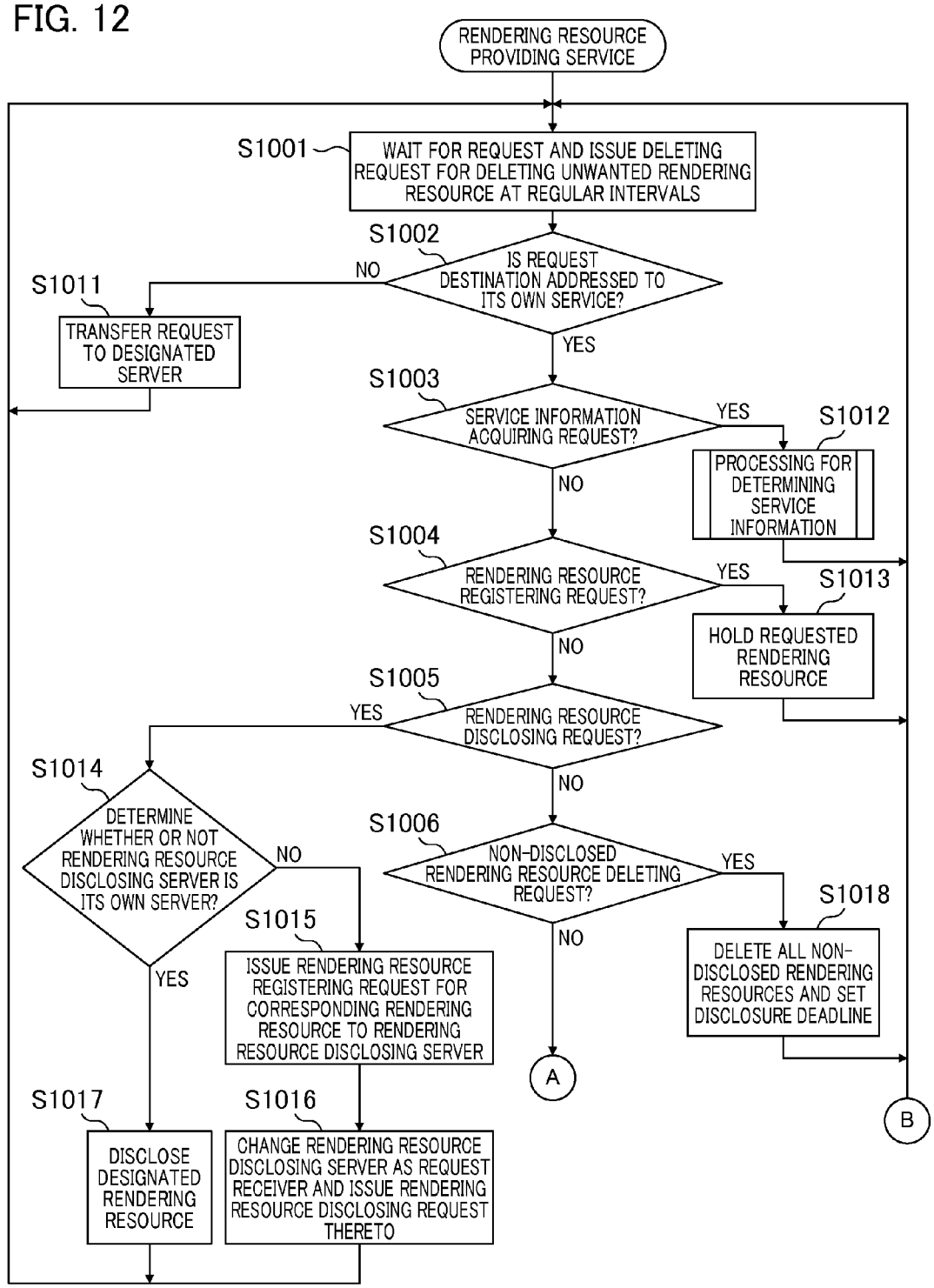
FIG. 12 is a flowchart illustrating processing by a rendering resource providing service.
Figure 13:
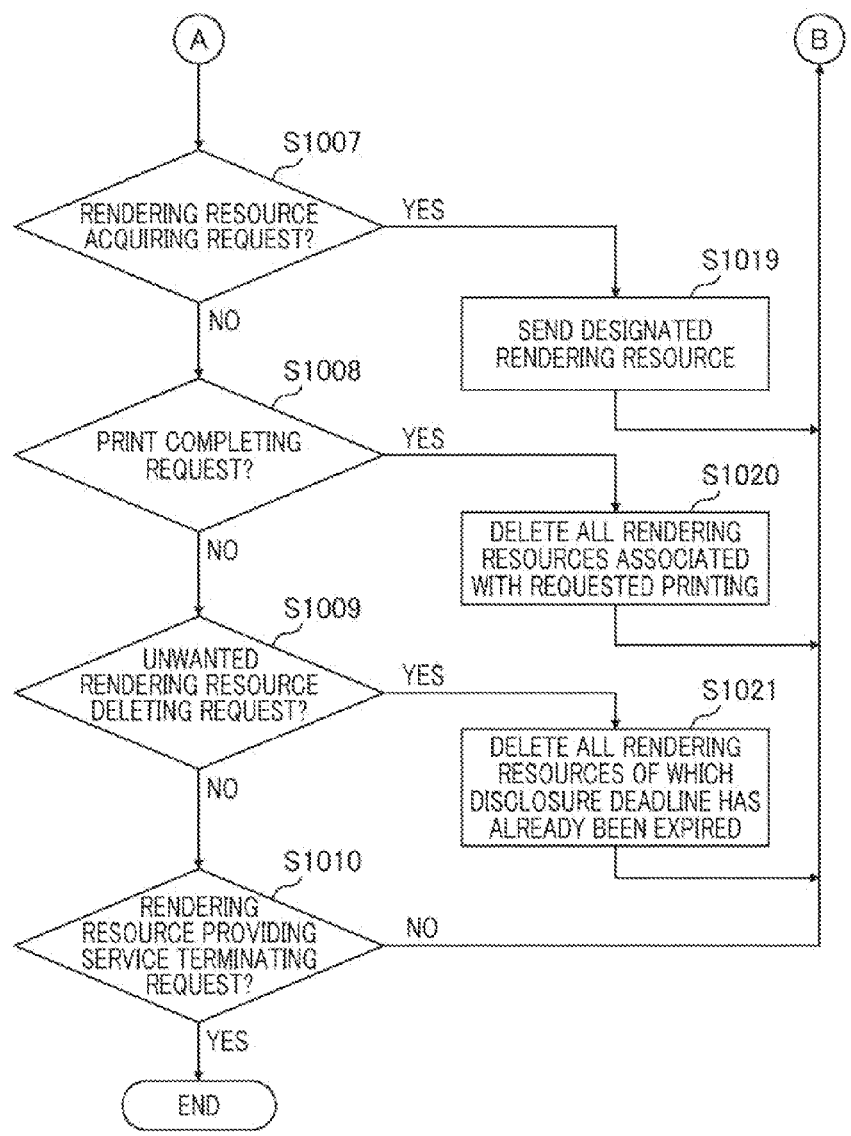
FIG. 13 is a flowchart illustrating processing by a rendering resource providing service.

FIGS. 12 and 13 are flowcharts illustrating rendering resource providing service processing. In general, the rendering resource providing service 310 is stored in the external memory 211. The rendering resource providing service 310 is read into the RAM 202 upon activation of a client computer and then is executed by the CPU 201. The rendering resource providing service 310 is operated as a resident service. The rendering resource providing service 310 is operated by responding to a request. Thus, the rendering resource providing service 310 waits for a request after activation. Furthermore, the rendering resource providing service 310 issues a deleting request for deleting an unwanted rendering resource to the rendering resource storing unit 311 at regular intervals (step S1001).

Firstly, upon acquiring some request, the rendering resource providing service 310 determines whether or not the destination of the request is addressed to its own service (step S1002). When the request is not addressed to its own service, the rendering resource providing service 310 transfers the request to the designated server (step S1011). When the request is addressed to its own service, the process advances to step S1003. In this case, the content of the request is determined in determining steps in steps S1003 to S1010. When the rendering resource providing service 310 determines that the request is made to its own service, the rendering resource providing service 310 performs processing included in the request. When service information acquisition is requested from the rendering resource managing filter 309 (YES in step S1003), the rendering resource providing service 310 performs determination processing for determining service information in step S1012. The processing corresponds to service information acquisition processing in step S603 shown in FIG. 8. In the first embodiment, the rendering resource providing service 310 returns a rendering resource registering server, a rendering resource disclosing server, and the service information 800 serving as a client computer to the rendering resource managing filter 309. The details of service information determination processing will be described below in a second embodiment.

Figure 14C:
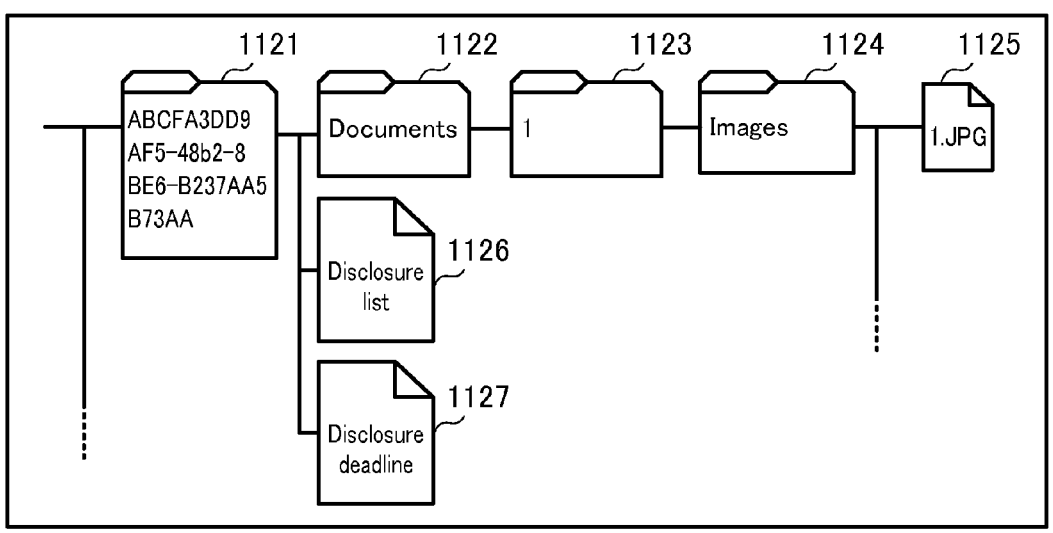

When rendering resource registration is requested from the rendering resource managing filter 309 (YES in step S1004), the rendering resource providing service 310 causes the rendering resource storing unit 311 to store the requested rendering resource in step S1013. The processing corresponds to rendering resource registering request processing on the rendering resource managing filter 309 in step S608 shown in FIG. 8 and step S705 shown in FIG. 9. FIG. 14C shows an example of management of the rendering resource in the rendering resource registering request 840 by means of the rendering resource storing unit 311. The rendering resource storing unit 311 stores 1.JPEG that is binary data of a rendering resource at the positions of the folder configuration 1121 to 1125 corresponding to the rendering resource identification information 843. The rendering resource storing unit 311 stores a disclosure list 1126 representing rendering resources to be disclosed and a disclosure deadline file 1127 where a disclosure deadline is described in the folder 1121 having print job identification information. In the initial state, the disclosure list 1126 and the disclosure deadline file 1127 are empty files. In other words, when a rendering resource registering request is received, a rendering resource is only stored in a folder corresponding to the rendering resource identification information 843 stored in the rendering resource storing unit 311.

When a rendering resource disclosing request is made from the rendering resource managing filter 309 (YES in step S1005), the rendering resource providing service 310 confirms in step S1014 whether or not the rendering resource disclosing server 852 for disclosing the rendering resource disclosing request is its own server. In the first embodiment, the rendering resource disclosing server is the server itself. Thus, the rendering resource providing service 310 causes the rendering resource storing unit 311 to hold the disclosure list 1126 shown in FIG. 14C (step S1017). The processing corresponds to rendering resource disclosing request processing on the rendering resource managing filter 309 in step S609 shown in FIG. 8 and step S906 shown in FIG. 11. An exemplary case where the rendering resource disclosing server is other than itself will be described below in the second embodiment.

When a non-disclosed rendering resource deleting request is made from the rendering resource managing filter 309 (YES in step S1006), the rendering resource providing service 310 references the disclosure list 1126 stored in the folder 1121 of the rendering resource storing unit 311. A non-disclosed rendering resource (in other words, rendering resource which is unnecessary to be disclosed) which is not described in the disclosure list 1126 stored under the folder 1121 is deleted from the rendering resource storing unit 311 (step S1018). Furthermore, a disclosure deadline (presentation deadline) is described in the disclosure deadline file 1127 of the folder 1121 stored in the rendering resource storing unit 311. The processing corresponds to rendering resource disclosing request processing on the rendering resource managing filter 309 in step S611 shown in FIG. 8 and step S711 shown in FIG. 9. By means of the processing, a client computer only holds a rendering resource which is necessary to be disclosed, i.e., a rendering resource which cannot be held by the image forming device 102, whereby the client computer does not need to hold excess data. Also, due to the provision of a presentation deadline, a rendering resource to be disclosed can be efficiently managed.

When a rendering resource acquiring request is made from the image forming device 102 (YES in step S1007), the rendering resource providing service 310 acquires a rendering resource which is present at the disclosed location based on the request from the rendering resource storing unit 311 in step S1019. Then, the acquired rendering resource is sent to the image forming device 102. The processing corresponds to rendering resource acquisition processing on the image forming device 102 in step S612 shown in FIG. 8.

When a print completing request is made from the image forming device 102 (YES in step S1008), the rendering resource providing service 310 deletes the folder having the print job identification number 810 from the rendering resource storing unit 311 in step S1020. The rendering resource providing service 310 also deletes folders and files which are arranged in association with the folder. By means of the deletion processing, all the files relating to the print job identification number are deleted from the rendering resource storing unit 311. The processing corresponds to print completion processing on the image forming device 102 in step S613 shown in FIG. 8.

The rendering resource providing service is designated such that an unwanted rendering resource deleting request is issued in a certain time (step S1001). When the unwanted rendering resource deleting request is made (YES in step S1009), in step S1021, the rendering resource providing service 310 confirms all the disclosure deadline files 1127 stored in a folder relating to the print job identification number in the rendering resource storing unit 311. For those of which the disclosure deadline has already been extended, the rendering resource providing service 310 deletes the folder relating to the print job identification number and folders and files which are arranged in association with the folder.

When a rendering resource providing service ending request is received from the image forming device 102 and the rendering resource providing service 310 confirms that authentication information described in the request is correct (YES in step S1010), the rendering resource providing service is ended. Otherwise, the process advances to step S1001 and waits for the next request. According to the information processing device of the present invention in the above embodiment, an information processing device that accurately provides a rendering resource can be provided even when an image forming device cannot hold a rendering resource exceeding the rendering resource storage upper limit. In this manner, a printer on which a small amount of memory is mounted can also perform printing. The positional information about a rendering resource to be disclosed is added to a Fixed page, and thus, an image forming device can accurately acquire the rendering resource. Furthermore, a disclosing target is selected in consideration of the rendering resource storage upper limit value for a printer, whereby the amount of data of rendering resources held by a client PC for disclosing the rendering resource providing service can be reduced.

Second Embodiment

In the second embodiment, a description will be given of a method in which the performance of the client computer 101 or the portable device 104 is determined so that a rendering resource providing service in cooperation with an external server is realized as appropriate. In the second embodiment, a description will be given of the client computer 101 or the portable device 104 shown in FIG. 1 as a client device held by a client. As in the first embodiment, the portable device 104 is mutually communicable with the image forming device 102 via the LAN 103 in the system configuration diagram shown in FIG. 1. Furthermore, the in-house server 105 is connected to the LAN 103. The LAN 103 is also connected to the outside server 107 via Internet 106. The components of the client devices 101/104 and the servers 105/107 are in a communicable state with each other. In the second embodiment, the external servers 105/107 mediate communication between the image forming device 102 and the client devices 101/104.

Figure 15:
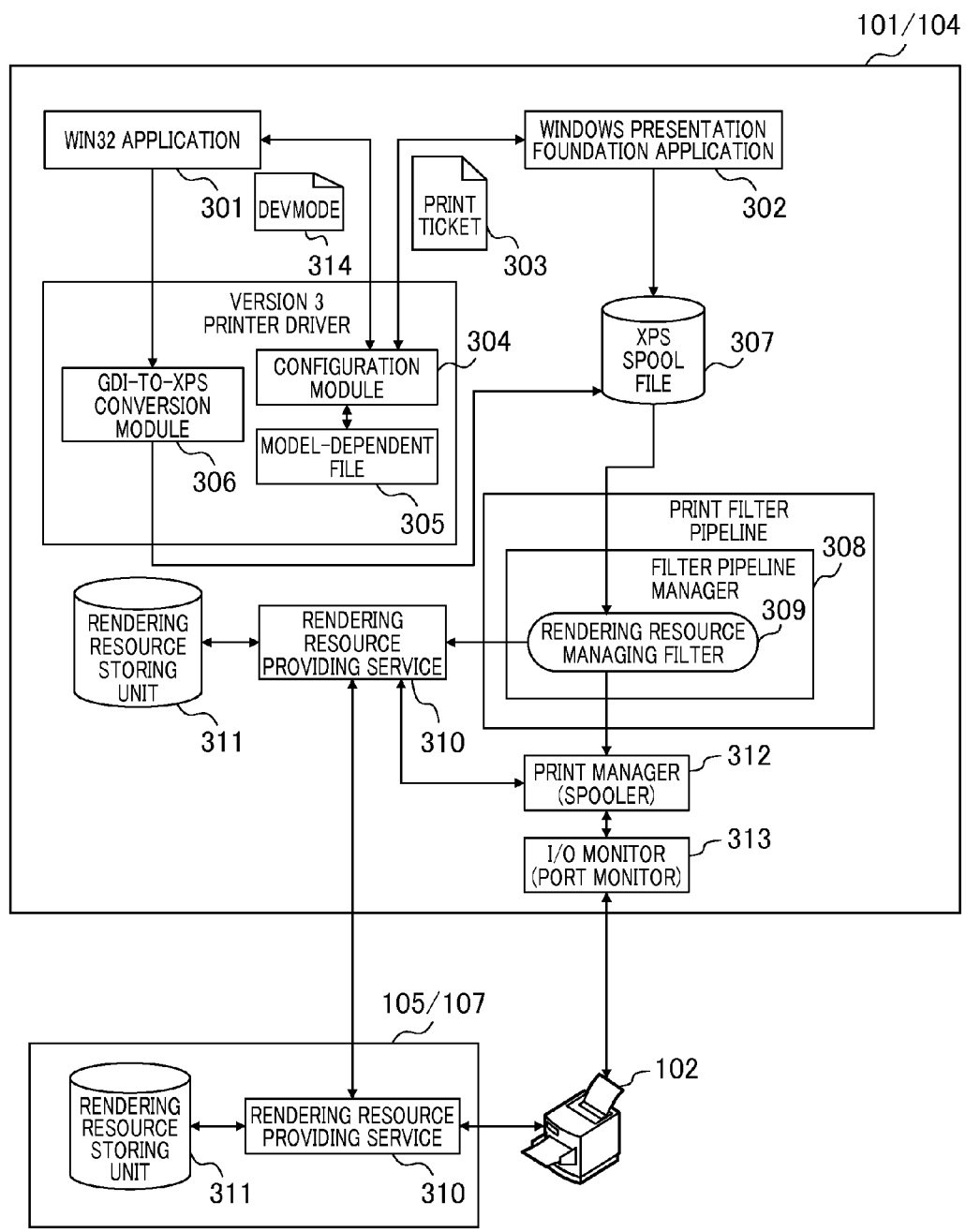
FIG. 15 is a block diagram illustrating the module configuration according to a second embodiment.

The hardware configuration of the portable device 104, the in-house server 105, and the outside server 107 are the same as that of the client computer 101 shown in FIG. 2 although there is a difference in performance between the two. Thus, a description of the hardware configuration will be omitted. FIG. 15 is a block diagram illustrating a module configuration according to the second embodiment. In addition to the components shown in the block diagram of FIG. 3, the rendering resource providing service 310 and the rendering resource storing unit 311 are arranged on the in-house server 105 and the outside server 107. The rendering resource providing service 310 of the portable device 104 and the rendering resource providing service 310 of the in-house server 105 and the outside server 107 are communicable with each other via a network. Furthermore, the rendering resource providing service 310 of the in-house server 105 and the outside server 107 is communicable with the image forming device 102 via a network. The operation of an XPS print path, an XPS stream to be acquired from the filter pipeline manager 308, and the processed XPS stream are the same as those in the first embodiment. The second embodiment is different from the first embodiment in that a service information determination processing 1012 performed by the rendering resource providing service 310 of a client computer and the service information 800 generated thereby are different from those in the first embodiment.

Figure 16:
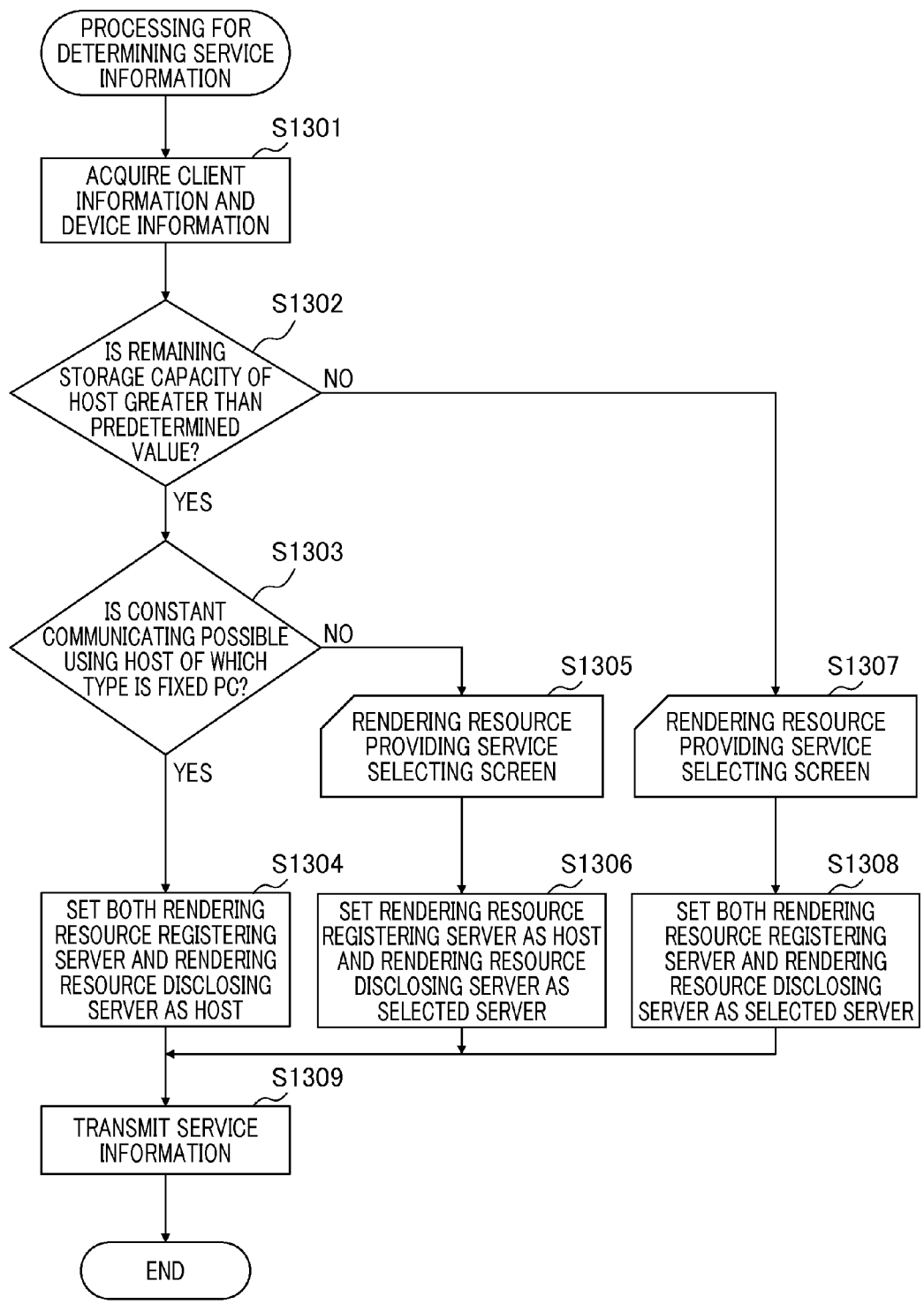
FIG. 16 is a flowchart illustrating processing for determining service information.

FIG. 16 is a flowchart illustrating service information determination processing. Firstly, in step S1301, the rendering resource providing service 310 on a client computer acquires client information 1100 and printer information 1110 exemplified in FIGS. 14A and 14B.

The client information 1100 includes a residual storage capacity 1101, a communication connection state 1102, and a rendering resource providing server list 1108. The residual storage capacity 1101 is the remaining amount of current storage capacity of a client computer. The communication connection state 1102 is information indicating either ad-hoc communication connection or permanent communication connection. In the case of a non-movable device such as the client computer 101, the communication connection state 1102 is set as "constantly connectable". In the case of a movable device such as the portable device 104, the communication connection state 1102 is set as "non-constantly connectable". The rendering resource providing server 1103 is a list of external servers which are communicable from a client computer. The server names set to the rendering resource managing filter 309 in advance by a user are listed on the rendering resource providing server 1103. The rendering resource providing service 310 acquires the client information 1100 from the rendering resource managing filter 309.

The printer information 1110 includes the rendering resource storage upper limit 1111 that is the upper limit value of storage capacity for holding rendering resources in the image forming device 102. Furthermore, the printer information 1110 includes information about rendering resource providing servers which are communicable from the image forming device 102 and are set in the image forming device 102. Reference numeral 1112 denotes a list of in-house servers and reference numeral 1113 denotes a list of outside servers. These lists are set by the administrator of a printer in advance and are stored in the external memory 224 of the image forming device 102. The rendering resource providing service 310 acquires the printer information 1110 from the image forming device 102 via the print manager 312 and the I/O monitor 313.

The rendering resource providing service 310 determines whether or not the residual storage capacity of the client devices 101/104 is greater than a predetermined value with reference to the acquired client information 1100 (step S1302). The predetermined value is a threshold value predetermined by empirical rules or experiments. When the rendering resource providing service 310 determines that the residual storage capacity of the client devices 101/104 is greater than a predetermined value, the rendering resource providing service 310 determines whether or not the communication connection state 1102 can be set as "constantly connectable" (step S1303). When the residual storage capacity is greater than a predetermined value and the communication connection state 1102 is in a constantly connectable state, the rendering resource providing service 310 determines that the client devices 101/104 can perform the entire processing. The rendering resource providing service 310 determines that the client devices 101/104 perform processing as a rendering resource registering server and a rendering resource disclosing server (step S1304).

In other words, the rendering resource providing service 310 functions as a determining unit that determines a registration destination and a management destination of a rendering resource based on information about the residual storage capacity of a client device and information about a communication connection state. In step S1304, the rendering resource providing service 310 determines the device itself as the registration destination and the management destination of a rendering resource. The rendering resource providing service 310 passes service information in which the URL of the server of a client computer itself is described in both the rendering resource registering server 802 and the rendering resource disclosing server 803 of the service information 800 to the rendering resource managing filter 309 (step S1309). The operation performed in this case is the same as that in the first embodiment. More specifically, the rendering resource providing service 310 functions as a registering unit that registers a rendering resource in accordance with the registering request from the rendering resource managing filter 309. Also, the rendering resource providing service 310 functions as a managing unit that manages a rendering resource as a rendering resource to be disclosed, i.e., a rendering resource to be provided in accordance with the disclosing request from the rendering resource managing filter 309.

When the residual storage capacity of the client devices 101/104 is greater than a predetermined value but a constant connection cannot be established (NO in step S1303), the rendering resource providing service 310 determines that there is a capacity of the amount of data to be handled by the device itself. Thus, in this case, the rendering resource providing service 310 determines the device itself (the client devices 101/104) as a rendering resource registering server. The rendering resource providing service 310 also determines that the client devices 101/104 may not be able to communicate with the image forming device 102 after completion of printing. Thus, in order to handle a rendering resource acquiring request from the image forming device 102, the rendering resource providing service 310 determines that rendering resource disclosing servers are the external servers 105/107 other than the client devices 101/104. In other words, the rendering resource providing service 310 determines the external devices as the management destinations of a rendering resource.

Figure 17:
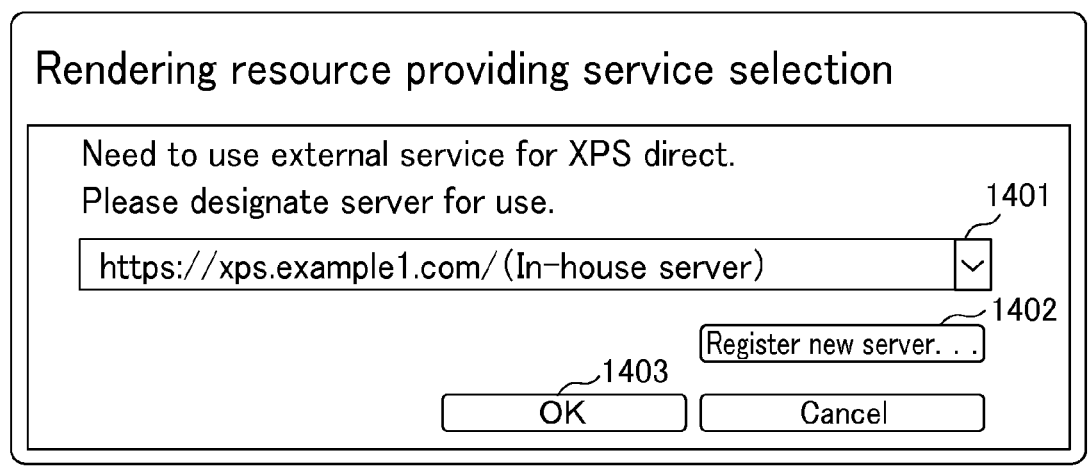
FIG. 17 is a diagram illustrating a user interface for selecting a rendering resource providing service.

For determining which external server is used, the I/O monitor 313 provided in a client device displays a rendering resource providing service selecting user interface (UI) 1400 shown in FIG. 17 on the display 210 of the client device (step S1305). The rendering resource providing service selecting UI 1400 includes a list box 1401. A common portion is displayed on the list box 1401 by comparing the list 1103 of rendering resource providing servers in the client information 1100 with the rendering resource providing server lists 1112 and 1113 in the printer information 1110. The in-house servers and the outside servers listed in the rendering resource providing server lists 1112 and 1113 are displayed in parenthesis, so that a user can select which server is to be used (either an in-house server or an outside server). In the present embodiment, the rendering resource providing service 310 gives a priority to an in-house server as the initial value selecting item in the list box 1401 and also gives a priority to the top listed on each of the rendering resource providing server lists 1112 and 1113 so as to determine and display one server.

When there is no common server described in the rendering resource providing server list 1103 and the rendering resource providing server lists 1112 and 1113, the client devices 101/104 may not be able to communicate with the image forming device 102. In order to overcome such circumstances, a new server registering button 1402 is prepared on the rendering resource providing service selecting UI 1400. When the pressing of the button 1402 by a user with the operation input device 209 is detected, a user registration screen to the server on the rendering resource providing server lists 1112 and 1113 is displayed. Upon completion of a user registration in the server, the server is added to the list 1103 of rendering resource providing servers in the client information 1100. Furthermore, the server is added to the list 1103. When the pressing of an OK button 1403 by a user of the operation input device 209 is detected, the rendering resource providing server displayed on the list 1103 is determined as a selected server. On the basis of the determination, the rendering resource providing service 310 determines that the client devices 101/104 is the rendering resource registering servers and the selected server is the rendering resource disclosing server and that processing is performed (step S1306). The rendering resource providing service 310 describes the client device itself in the rendering resource registering server 802 in the service information 800 and the server selected in the rendering resource disclosing server 803, and passes information to the rendering resource managing filter 309. Upon reception of the service information 800, the rendering resource managing filter 309 generates information about the rendering resource registering request 840 and the rendering resource disclosing request 850.

Figure 18:
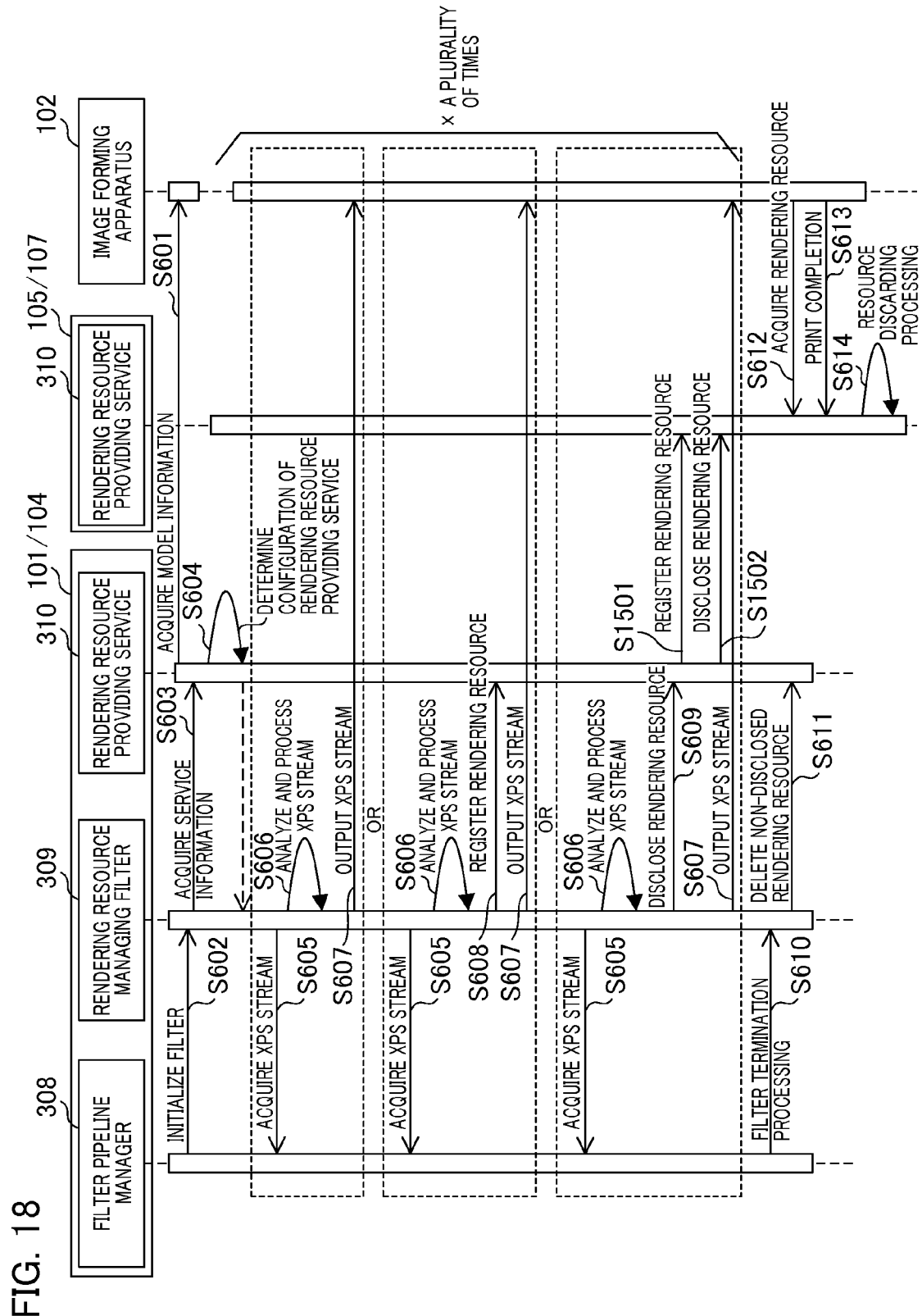
FIG. 18 is a sequence diagram illustrating processing relating to rendering resource according to a second embodiment.

FIG. 18 shows a sequence diagram illustrating system operation processing performed when a client device is determined as a rendering resource registering server and an external server (selected server) is determined as a rendering resource disclosing server. A description will be given while focusing on those relating to the service information 800, i.e. a rendering resource registering request in step S608, a rendering resource disclosing request in step S609, and a non-disclosed rendering resource deleting request in step S611. In step S608 of processing a rendering resource registering request shown in FIG. 18, the rendering resource managing filter 309 designates the rendering resource registering server 802 in the service information 800 as the rendering resource registering request receiver 841 in the rendering resource registering request 840 shown in FIG. 8. The rendering resource registering server designated in the service information 800 is also designated as the rendering resource registering server 842. In the present embodiment, the rendering resource managing filter 309 is designated by the client devices 101/104. In this case, the same processing as that in the first embodiment is performed.

In step S609 of processing a rendering resource disclosing request shown in FIG. 18, the rendering resource managing filter 309 designates the rendering resource registering server 802 as the rendering resource registering request receiver 851 included in the rendering resource disclosing request 850. The rendering resource disclosing server 803 designated in the service information 800 is designated as the rendering resource disclosing request receiver 852. In the present embodiment, the rendering resource managing filter 309 designates the client devices 101/104 as the rendering resource registering server 802 and the external servers 105/107 selected by a user as the rendering resource disclosing server 803. The rendering resource providing service 310 of the client devices 101/104 that have received the rendering resource disclosing request 850 determines that the rendering resource disclosing server is not the device itself. The rendering resource providing service 310 of the client devices 101/104 issues a rendering resource registering request for the rendering resource to the external servers 105/107 (step S1501). Furthermore, the rendering resource providing service 310 designates the external servers 105/107 as the disclosure destination of the rendering resource disclosing server 852 and issues a rendering resource disclosing request including the rendering resource identification information 853 (step S1502). In other words, the rendering resource providing service 310 executes a rendering resource disclosing request to an external server serving as a rendering resource disclosing server in accordance with the disclosing request from the rendering resource managing filter 309. The rendering resource registering server 802 in the service information 800 is designated as the request receiver in step S611 of making a request for deleting a non-disclosed rendering resource as shown in FIG. 18. In this case, the client devices 101/104 are designated as the request receivers. The operation performed in this case is the same as that in the first embodiment.

Figure 19:
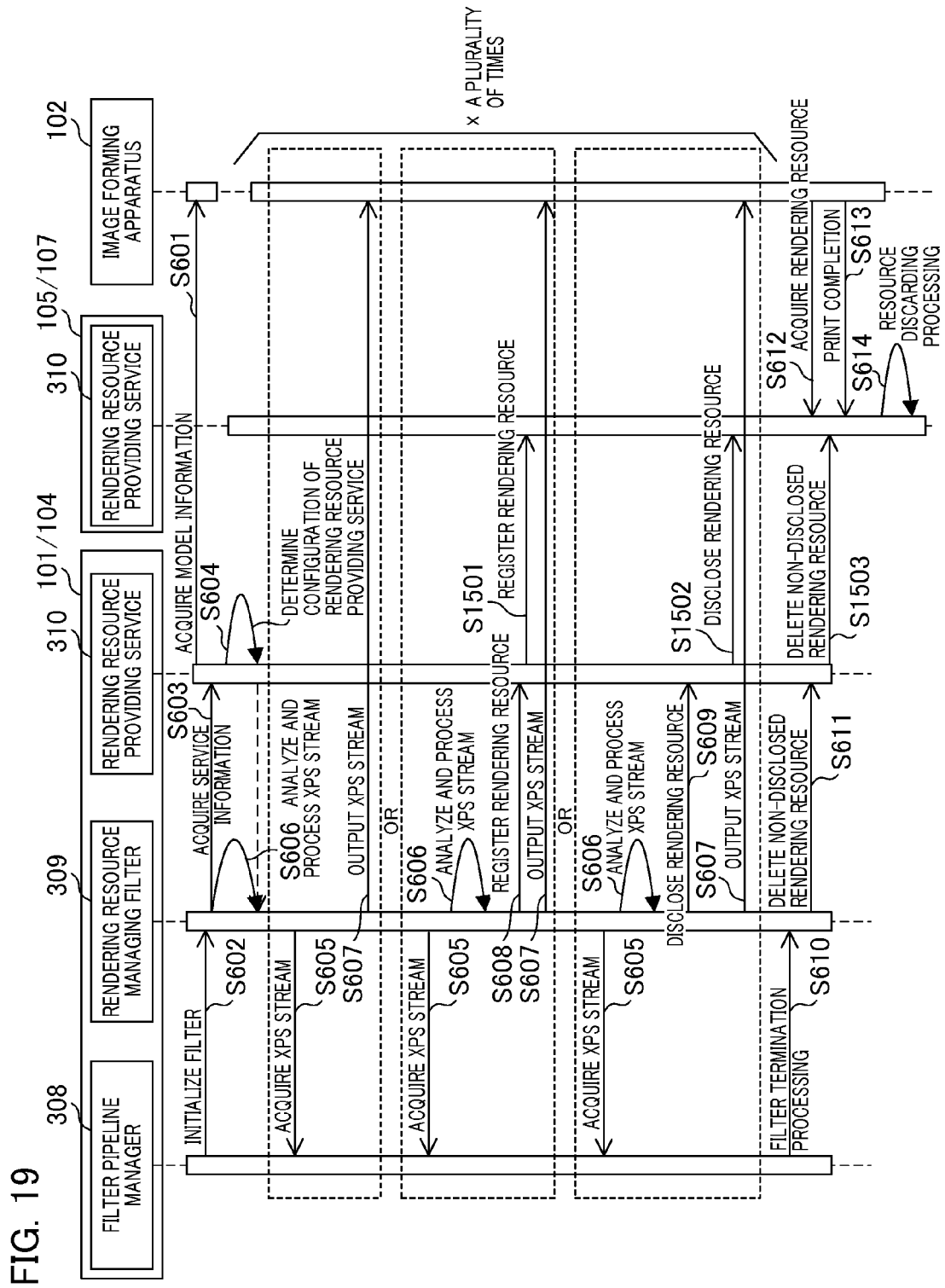
FIG. 19 is a sequence diagram illustrating processing relating to rendering resource according to a second embodiment.

When the remaining amount of storage capacity of the client devices 101/104 is equal to or less than a predetermined threshold value, the rendering resource providing service 310 determines that the client devices 101/104 cannot hold a rendering resource for rendering resource registration and rendering resource disclosure. The rendering resource providing service 310 determines the external servers 105/107 as the rendering resource registering server and the rendering resource disclosing server. The rendering resource providing service selecting UI 1400 shown in FIG. 17 is displayed on the display 210 of the client devices 101/104 in order to determine which external server is to be used. The service information 800 describing a server selected as the rendering resource registering server 802 and the rendering resource disclosing server 803 is passed to the rendering resource managing filter 309. FIG. 19 shows a sequence diagram illustrating a rendering resource providing service in the second embodiment.

A description will be given while focusing on those relating to the service information 800, i.e. a rendering resource registering request in step S608, a rendering resource disclosing request in step S609, and a non-disclosed rendering resource deleting request in step S611. The request receiver of the above three requests is a server selected by the rendering resource providing service selecting UI 1400. The rendering resource providing service 310 that has received these requests from the rendering resource managing filter 309 determines that these requests are not destined for the rendering resource providing service 310 of the client devices 101/104. The rendering resource providing service 310 of the client devices 101/104 transfers a request to the designated server (step S1501 shown in FIG. 19). By means of the operation, a rendering resource registering request in step S1501, a rendering resource disclosing request in step S1502, and a non-disclosed rendering resource deleting request in step S1503 are transferred to the rendering resource providing service 310 of the external servers 105/107 for execution. The operation performed by the rendering resource providing service 310 of the external servers 105/107 is the same as that performed by the rendering resource providing service 310 of the client devices 101/104 described with reference to FIGS. 12 and 13. According to the embodiment, the performance of the client devices 101/104 can be determined so that a rendering resource providing service in cooperation with an external server other than a client device as appropriate is realized.

In the above embodiment, the rendering resource managing filter 309 makes a disclosing request to the rendering resource providing service 310 due to the fact that the total amount of data of a rendering resource exceeds the storage upper limit value for the image forming device 102. However, the present invention is not limited thereto. A request for disclosing the identical rendering resource may be made when the identical rendering resource is referenced by different Fixed pages more than a predetermined plurality of times (e.g., two or more) as a result of analysis of a structured stream by the rendering resource managing filter 309. In the above embodiment, all the rendering resources are stored in the rendering resource storing unit 311 in advance and a rendering resource which is unnecessary to be disclosed is deleted after the rendering resource managing filter 309 is processed all the XPS streams. In contrast, when the total amount of data exceeds the storage upper limit value for the image forming device 102 as a result of additional registration of a rendering resource, only a rendering resource which cannot be held by the image forming device 102 due to the excess of the storage upper limit value may be registered. Furthermore, in the above embodiment, new attributes 504 and 505 are added to a Fixed page for describing the disclosed location of a rendering resource. In contrast, as shown in FIG. 7B, a rendering resource disclosed location 507 may also be written to a piece representing a rendering resource relating to a Fixed page as an attribute.

In the second embodiment, a user registration is made from the rendering resource providing service 310 so as to share an external server and authentication information. For that purpose, in steps S1501 to step S1503 of providing communication between rendering resource providing services, user authentication and communication data may also be encrypted. Likewise, a user registration is made for the image forming device 102 so as to share an external server and authentication information. For that purpose, in steps S612 and S613 of providing communication between a rendering resource providing service and the image forming device 102, user authentication and communication data may also be encrypted. In this manner, a robust security function can be ensured.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-075948 filed on Mar. 29, 2012, which is hereby incorporated by reference herein in its entirety.

What is claimed is:

1. An information processing device that processes data including (i) a rendering resource, (ii) a first page rendering command including a link to the rendering resource, and (iii) a second page rendering command including a link to the rendering resource, the information processing device comprising:
   a first transmitting unit configured to transmit the rendering resource and the first page rendering command to an image forming device;
   a registering unit configured to register a copy of the rendering resource in a storage area located outside the image forming device;
   an including unit configured to include a link to the registered copy in the second page rendering command;
   a second transmitting unit configured to transmit, to the image forming device, the second page rendering command including the link to the registered copy;
   an accepting unit configured to accept a request issued by the image forming device; and
   a third transmitting unit configured to transmit the registered copy to the image forming device in response to the accepted request.

2. The information processing device according to claim 1, wherein a format of the data is an extended markup language paper specification (XPS) stream format.

3. The information processing device according to claim 2, wherein a format of the transmitted first page rendering command and a format of the transmitted second page rendering command are the XPS stream format.

4. The information processing device according to claim 1, wherein the including unit performs inclusion by replacing the link to the rendering resource included in the second page rendering command with the link to the registered copy of the rendering resource.

5. The information processing device according to claim 1, wherein, if, in processing of the transmitted second page rendering command by the image forming device, the rendering resource is not stored in a storage area located in the image forming device, the image forming device acquires the copy of the rendering resource registered in the storage area located outside the image forming device.

6. The information processing device according to claim 1, wherein the registering unit registers the copy of the rendering resource in a rendering resource storing unit of the information processing device.

7. The information processing device according to claim 1, wherein the registering unit registers the copy of the rendering resource in an external device.

8. The information processing device according to claim 1, wherein the request is issued by the image forming device based on the link to the registered copy included in the transmitted second page rendering command.

9. The information processing device according to claim 1, wherein the rendering resource is joint photographic experts group (JPEG) image data or font data.

10. A method for controlling an information processing device that processes data including (i) a rendering resource, (ii) a first page rendering command including a link to the rendering resource, and (iii) a second page rendering command including a link to the rendering resource, the method comprising:
    transmitting the rendering resource and the first page rendering command to an image forming device;
    registering a copy of the rendering resource in a storage area located outside the image forming device;
    including a link to the registered copy in the second page rendering command;
    transmitting, to the image forming device, the second page rendering command including the link to the registered copy;
    accepting a request issued by the image forming device; and
    transmitting the registered copy to the image forming device in response to the accepted request.

11. The method according to claim 10, wherein a format of the data is an extended markup language paper specification (XPS) stream format.

12. The method according to claim 10, wherein the including the link is executed by replacing the link to the rendering resource included in the second page rendering command with the link to the registered copy of the rendering resource.

13. The method according to claim 10, wherein registering the copy includes registering the copy of the rendering resource in a rendering resource storing unit of the information processing device.

14. The method according to claim 10, wherein registering the copy includes registering the copy of the rendering resource in an external device.

15. A non-transitory storage medium on which is stored a computer program for making a computer execute a method for controlling an information processing device that processes data including (i) a rendering resource, (ii) a first page rendering command including a link to the rendering resource, and (iii) a second page rendering command including a link to the rendering resource, the method comprising:
    transmitting the rendering resource and the first page rendering command to an image forming device;

registering a copy of the rendering resource in a storage area located outside the image forming device;

including a link to the registered copy in the second page rendering command;

transmitting, to the image forming device, the second page rendering command including the link to the registered copy;

accepting a request issued by the image forming device; and transmitting the registered copy to the image forming device in response to the accepted request.

16. An information processing device that transmits a structured stream including page rendering information for representing intra-page rendering and a rendering resource referenced from the plurality of different page rendering information to an image forming device to thereby cause the image forming device to perform print processing, the information processing device comprising:

a registering request unit configured to make a registering request for registering the rendering resource included in the structured stream and hold information about the total amount of data of a registered rendering resource upon registration of the rendering resource;

a management request unit configured to analyze the page rendering information included in the structured stream and, when the total amount of data of the registered rendering resource upon registration of the rendering resource referenced by the page rendering information exceeds a rendering resource storage upper limit value of the image forming device, make a request for managing the referenced rendering resource as a rendering resource to be provided;

a transmitting unit configured to set access information to access the managed rendering resource to be provided to the analyzed page rendering information and transmit the page rendering information in which the access information is set and the registered rendering resource to the image forming device;

a determining unit configured to determine a registration destination and a management destination of the rendering resource based on information about the residual storage capacity of the information processing device and information about the communication connection state of the same;

a registering unit configured to register the rendering resource in accordance with a registering request from the registering request unit when the information processing device itself is determined as the registration destination of the rendering resource; and a managing unit configured to manage the rendering resource as the rendering resource to be provided in accordance with a management request from the management request unit when the information processing device itself is determined as the management destination of the rendering resource.

17. The information processing device according to claim 16, wherein, when the residual storage capacity of the information processing device is greater than a predetermined threshold value and the information processing device is constantly connectable, the determining unit determines the information processing device itself as the registration destination and the management destination of the rendering resource, wherein, when the residual storage capacity of the information processing device is greater than a predetermined threshold value and the information processing device is not constantly connectable, the determining unit determines the information processing device itself as the registration destination of the rendering resource and an external device as the management destination of the rendering resource, and wherein, when the residual storage capacity of the information processing device is equal to or less than a predetermined threshold value, the determining unit determines an external device as the registration destination and the management destination of the rendering resource.

18. The information processing device according to claim 16, wherein, when an external device is determined as the management destination of the rendering resource, the managing unit further executes a management request for managing the rendering resource to the external device in accordance with the management request from the management request unit.

19. The information processing device according to claim 16, further comprising:

a deleting request unit configured to make a deleting request for deleting a rendering resource, which is not the rendering resource to be provided from among registered rendering resources, to the registration destination of the rendering resource.

20. The information processing device according to claim 16, wherein the structured stream is an extended markup language paper specification (XPS) stream to be sequentially accessed.

21. An information processing system comprising:

an image forming device; and an information processing device that transmits a structured stream including page rendering information for representing intra-page rendering and a rendering resource referenced from the plurality of different page rendering information to an image forming device to thereby cause the image forming device to perform print processing, wherein the information processing device includes:

a registering request unit configured to make a registering request for registering the rendering resource included in the structured stream and hold information about the total amount of data of a registered rendering resource upon registration of the rendering resource;

a management request unit configured to analyze the page rendering information included in the structured stream and, when the total amount of data of the registered rendering resource upon registration of the rendering resource referenced by the page rendering information exceeds a rendering resource storage upper limit value of the image forming device, make a request for managing the referenced rendering resource as a rendering resource to be provided;

a transmitting unit configured to set access information to access the managed rendering resource to be provided to the analyzed page rendering information and transmit the page rendering information in which the access information is set and the registered rendering resource to the image forming device a determining unit configured to determine a registration destination and a management destination of the rendering resource based on information about the residual storage capacity of the information processing device and information about the communication connection state of the same;

a registering unit configured to register the rendering resource in accordance with a registering request from the registering request unit when the information processing device itself is determined as the registration destination of the rendering resource; and a managing unit configured to manage the rendering resource as the rendering resource to be provided in accordance with a management request from the management request unit when the information processing device itself is determined as the management destination of the rendering resource.

22. A method for controlling an information processing device that transmits a structured stream including page rendering information for representing intra-page rendering and a rendering resource referenced from the plurality of different page rendering information to an image forming device to thereby cause the image forming device to perform print processing, the method comprising:

making a registering request for registering the rendering resource included in the structured stream and holding information about the total amount of data of a registered rendering resource upon registration of the rendering resource;

analyzing the page rendering information included in the structured stream and, when the total amount of data of the registered rendering resource upon registration of the rendering resource referenced by the page rendering information exceeds the rendering resource storage upper limit value of the image forming device, making a request for managing the referenced rendering resource as a rendering resource to be provided;

setting access information to access the managed rendering resource to be provided to the analyzed page rendering information and transmitting the page rendering information in which the access information is set and the registered rendering resource to the image forming device;

determining a registration destination and a management destination of the rendering resource based on information about the residual storage capacity of the information processing device and information about the communication connection state of the same;

registering the rendering resource in accordance with the registering request when the information processing device itself is determined as the registration destination of the rendering resource; and managing the rendering resource as the rendering resource to be provided in accordance with the request for managing the referenced rendering resource when the information processing device itself is determined as the management destination of the rendering resource.

23. A non-transitory storage medium on which is stored a computer program for making a computer execute a method for controlling an information processing device that transmits a structured stream including page rendering information for representing intra-page rendering and a rendering resource referenced from the plurality of different page rendering information to an image forming device to thereby cause the image forming device to perform print processing, the method comprising:

making a registering request for registering the rendering resource included in the structured stream and holding information about the total amount of data of a registered rendering resource upon registration of the rendering resource;

analyzing the page rendering information included in the structured stream and, when the total amount of data of the registered rendering resource upon registration of the rendering resource referenced by the page rendering information exceeds the rendering resource storage upper limit value of the image forming device, making a request for managing the referenced rendering resource as a rendering resource to be provided;

setting access information to access the managed rendering resource to be provided to the analyzed page rendering information and transmitting the page rendering information in which the access information is set and the registered rendering resource to the image forming device;

determining a registration destination and a management destination of the rendering resource based on information about the residual storage capacity of the information processing device and information about the communication connection state of the same;

registering the rendering resource in accordance with the registering request when the information processing device itself is determined as the registration destination of the rendering resource; and managing the rendering resource as the rendering resource to be provided in accordance with the request for managing the referenced rendering resource when the information processing device itself is determined as the management destination of the rendering resource.

* * * * *